US011115674B2

(12) United States Patent
Park et al.

(10) Patent No.: US 11,115,674 B2
(45) Date of Patent: Sep. 7, 2021

(54) METHOD AND DEVICE FOR INDUCING MOTION INFORMATION BETWEEN TEMPORAL POINTS OF SUB PREDICTION UNIT

(71) Applicant: UNIVERSITY-INDUSTRY COOPERATION GROUP OF KYUNG HEE UNIVERSITY, Yongin-si (KR)

(72) Inventors: Gwang Hoon Park, Seongnam-si (KR); Min Seong Lee, Pyeongtaek-si (KR); Young Su Heo, Suwon-si (KR); Yoon Jin Lee, Yongin-si (KR)

(73) Assignee: University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 16/857,531

(22) Filed: Apr. 24, 2020

(65) Prior Publication Data
US 2020/0252642 A1   Aug. 6, 2020

Related U.S. Application Data

(63) Continuation of application No. 15/109,573, filed as application No. PCT/KR2015/000050 on Jan. 5, 2015, now Pat. No. 10,681,369.

(30) Foreign Application Priority Data

Jan. 3, 2014   (KR) ........................ 10-2014-0000527
Jan. 6, 2014   (KR) ........................ 10-2014-0001531
Jan. 5, 2015   (KR) ........................ 10-2015-0000578

(51) Int. Cl.
*H04N 19/51*   (2014.01)
*H04N 19/597*   (2014.01)
(Continued)

(52) U.S. Cl.
CPC ........... *H04N 19/51* (2014.11); *H04N 19/159* (2014.11); *H04N 19/176* (2014.11); *H04N 19/52* (2014.11);
(Continued)

(58) Field of Classification Search
CPC .... H04N 19/51; H04N 19/597; H04N 19/176; H04N 19/70; H04N 19/159; H04N 19/52; H04N 19/436
(Continued)

(56) References Cited

U.S. PATENT DOCUMENTS 9,420,286 B2   8/2016 Chen et al.
2010/0091858 A1   4/2010 Yang
(Continued)

FOREIGN PATENT DOCUMENTS

CN   104365102 A   2/2015
JP   2011-259040 A   12/2011
(Continued)

OTHER PUBLICATIONS

An, Jicheng, et al. "3D-CE3.h related: Sub-PU level inter-view motion prediction," 5th Meeting of Joint Collaborative Team on 3D Video Coding Extension of ITU-T SG 16 WP3 and ISO/IEC JTC 1/SC 29/WG11, Vienna, Austria, Jul. 27-Aug. 2, 2013, pp. 1-4.
(Continued)

*Primary Examiner* — On S Mung
(74) *Attorney, Agent, or Firm* — NSIP Law

(57) ABSTRACT

According to the present invention, there is provided A method of encoding a three-dimensional (3D) image, the method comprising: determining a prediction mode for a current block as an inter prediction mode; determining whether a reference block corresponding to the current block in a reference picture has motion information; when the reference block has the motion information, deriving motion
(Continued)

information on the current block for each sub prediction block in the current block; and deriving a prediction sample for the current block based on the motion information on the current block.

5 Claims, 37 Drawing Sheets

(51) Int. Cl.
*H04N 19/176* (2014.01)
*H04N 19/52* (2014.01)
*H04N 19/70* (2014.01)
*H04N 19/159* (2014.01)
*H04N 19/436* (2014.01)

(52) U.S. Cl.
CPC ........... *H04N 19/597* (2014.11); *H04N 19/70* (2014.11); *H04N 19/436* (2014.11)

(58) Field of Classification Search
USPC .................................................. 375/240.16
See application file for complete search history.

(56) References Cited

U.S. PATENT DOCUMENTS

| | | | |
|---|---|---|---|
| 2013/0243088 A1 | 9/2013 | Lim et al. |
| 2013/0258052 A1 | 10/2013 | Li et al. |
| 2013/0336407 A1 | 12/2013 | Chen et al. |
| 2016/0134857 A1 | 5/2016 | An et al. |

FOREIGN PATENT DOCUMENTS

| | | | |
|---|---|---|---|
| JP | 2016-530784 A | 9/2016 |
| JP | 2016-530784 A | 9/2016 |
| JP | 6616733 B2 | 12/2019 |
| JP | 2020-39157 A | 3/2020 |
| JP | 2020-39158 A | 3/2020 |
| RU | 2181930 C2 | 4/2002 |
| WO | WO 2012/073057 A2 | 6/2012 |
| WO | WO 2013/016004 A1 | 1/2013 |
| WO | WO 2013/158097 A1 | 10/2013 |
| WO | WO 2013159643 A1 | 10/2013 |
| WO | WO 2013/188785 A1 | 12/2013 |
| WO | WO 2013/189205 A1 | 12/2013 |
| WO | WO 2015/010226 A1 | 1/2015 |

OTHER PUBLICATIONS

An, J. et al., "3D-CE3: Sub-PU level inter-view motion prediction," 6th Meeting on Joint Collaborative Team on 3D Video Coding Extension Development of ITU-T SG 16 WP 3 and ISO/IEC JTC 1/SC 29/WG 11, Doc., JCT3V-F0110, held in Geneva, CH on Oct. 25-Nov. 1, 2013 (5 pages).

An, J., et al. "3D-CE3: Sub-PU level interview motion prediction." JCT-3V Doc., JCT3V-F0110, Geneva, CH (2013).

Zhao, Xin., et al. "CE3 Related: Simplications to sub-PU level inter-view motion prediction", 6th Meeting of Joint Collaborative Team on 3D Video Coding Extension of ITU-T SG 16 WP3 and ISO/IEC JTC 1/SC 29/WG11, Geneva, CH, Oct. 25-Nov. 1, 2013, pp. 1-5.

Heo, Young, Su, et al. "3D-CE3: Simplifications of Sub-PU level temporal interview motion prediction", 7th Meeting of Joint Collaborative Team on 3D Video Coding Extensions of ITU-T SG 16 WP3 and ISO/IEC JTC 1/SC 29/WG11, San Jose, CA, USA, Jan. 11-14, 2014, pp. 1-4.

International Search Report dated Mar. 24, 2015 in counterpart International Application No. PCT/KR2015/000050 (2 pages in English; 2 Pages in Korean).

(a) texture  (b) depth information map

Ref  0  1  2  0
⊠ ⊠ ☐ ☐ storage space

⊠ ☐ ☐ ☐
Cur  0  1  2  0

METHOD AND DEVICE FOR INDUCING MOTION INFORMATION BETWEEN TEMPORAL POINTS OF SUB PREDICTION UNIT

CROSS-REFERENCE TO RELATED APPLICATIONS

This application is a continuation of application Ser. No. 15/109,573, filed on Jul. 1, 2016, which claims the benefit under 35 USC 119(a) of PCT Application No. PCT/KR2015/000050, filed on Jan. 5, 2015, which claims the benefit of Korean Patent Application Nos. 10-2014-0000527 filed Jan. 3, 2014, 10-2014-0001531 filed Jan. 6, 2014, and 10-2015-0000578 filed Jan. 5, 2015, in the Korean Intellectual Property Office, the entire disclosures of which are incorporated herein by reference for all purposes.

TECHNICAL FIELD

The present invention relates to apparatuses and methods of encoding/decoding 3D images, and more specifically, to image encoding/decoding methods and apparatuses that derive inter-view motion information in parallel according to sub prediction units.

BACKGROUND ART

Growing IT industry has spread HD (high definition) broadcast services worldwide and more and more users are getting used to HD images.

Accordingly, the users are demanding higher-quality and higher-resolution images and a number of organizations are spurring themselves to develop next-generation imaging devices to live up to such expectations. As a result, users may experience full HD (FHD) and ultra HD (UHD) supportive images.

Users' demand goes one more step for 3D images that may offer a 3D feel or effects. Various organizations have developed 3D images to meet users' such demand.

However, 3D images include depth map information as well as a true image (texture), and thus, have more data than 2D images. Accordingly, encoding/decoding 3D images with existing image encoding/decoding processes cannot exhibit sufficient encoding/decoding efficiency.

DETAILED DESCRIPTION OF INVENTION

Technical Problem

An object of the present invention is to provide a device and method for deriving motion information of a block targeted for encoding/decoding.

Another object of the present invention is to provide a device and method for removing data dependency in deriving motion information of a block targeted for encoding/decoding.

Still another object of the present invention is to provide a device and method for increasing image encoding/decoding efficiency by removing data dependency in deriving motion information of a block targeted for encoding/decoding on a per-sub prediction unit basis.

Yet still another object of the present invention is to provide a device and method for increasing image encoding/decoding efficiency using motion information of a reference block when deriving motion information of a block targeted for encoding/decoding on a per-sub prediction unit basis.

Technical Solution

According to an embodiment of the present invention, there may be provided a method of encoding a three-dimensional (3D) image, the method comprising: determining a prediction mode for a current block as an inter prediction mode; determining whether a reference block corresponding to the current block in a reference picture has motion information; when the reference block has the motion information, deriving motion information on the current block for each sub prediction block in the current block; and deriving a prediction sample for the current block based on the motion information on the current block.

Here, the current block and the reference block may be prediction blocks.

Here, the motion information on the reference block may be positioned at a center of the reference block.

Here, in the step of the deriving the motion information on the current block for each sub prediction block in the current block, if a sub prediction block in the reference block corresponding to a sub prediction block in the current block has motion information, the motion information on the sub prediction block of the current block may be derived as the motion information present in the sub prediction block of the reference block.

Here, if a sub prediction block in the reference block corresponding to a sub prediction block in the current block has not motion information, the motion information on the sub prediction block of the current block may be derived as the motion information of the reference block.

According to another embodiment of the present invention, there may be provided an apparatus of encoding a three-dimensional (3D) image, the apparatus comprising: a storage module determining a prediction mode for a current block as an inter prediction mode and determining whether a reference block corresponding to the current block in a reference picture has motion information; a deriving module, when the reference block has the motion information, deriving motion information on the current block for each sub prediction block in the current block and deriving a prediction sample for the current block based on the motion information on the current block.

Here, the current block and the reference block may be prediction blocks.

Here, the motion information on the reference block may be positioned at a center of the reference block.

Here, in the deriving module, if a sub prediction block in the reference block corresponding to a sub prediction block in the current block has motion information, the motion information on the sub prediction block of the currentblock may be derived as the motion information present in the sub prediction block of the reference block.

Here, if a sub prediction block in the reference block corresponding to a sub prediction block in the current block has not motion information, the motion information on the sub prediction block of the current block may be derived as the motion information of the reference block.

According to still another embodiment of the present invention, there may be provided A method of decoding a three-dimensional (3D) image, the method comprising: determining a prediction mode for a current block as an inter prediction mode; determining whether a reference block corresponding to the current block in a reference picture has motion information; when the reference block has the motion information, deriving motion information on the current block for each sub prediction block in the current block; and deriving a prediction sample for the current block based on the motion information on the current block.

Here, the current block and the reference block may be prediction blocks.

Here, the motion information on the reference block may be positioned at a center of the reference block.

Here, in the step of the deriving the motion information on the current block for each sub prediction block in the current block, if a sub prediction block in the reference block corresponding to a sub prediction block in the current block has motion information, the motion information on the sub prediction block of the current block may be derived as the motion information present in the sub prediction block of the reference block.

Here, if a sub prediction block in the reference block corresponding to a sub prediction block in the current block has not motion information, the motion information on the sub prediction block of the current block may be derived as the motion information of the reference block.

According to yet still another embodiment of the present invention, there may be provided An apparatus of decoding a three-dimensional (3D) image, the apparatus comprising: a storage module determining a prediction mode for a current block as an inter prediction mode and determining whether a reference block corresponding to the current block in a reference picture has motion information; and a deriving module, when the reference block has the motion information, deriving motion information on the current block for each sub prediction block in the current block and deriving a prediction sample for the current block based on the motion information on the current block.

Here, the current block and the reference block may be prediction blocks.

Here, the motion information on the reference block may be positioned at a center of the reference block.

Here, in the deriving module, if a sub prediction block in the reference block corresponding to a sub prediction block in the current block has motion information, the motion information on the sub prediction block of the current block may be derived as the motion information present in the sub prediction block of the reference block.

Here, if a sub prediction block in the reference block corresponding to a sub prediction block in the current block has not motion information, the motion information on the sub prediction block of the current block may be derived as the motion information of the reference block.

Advantageous Effects

The present invention may derive motion information of a block targeted for encoding/decoding.

The present invention may remove data dependency in deriving motion information of a block targeted for encoding/decoding.

The present invention may increase image encoding/decoding efficiency by removing data dependency in deriving motion information of a block targeted for encoding/decoding on a per-sub prediction unit basis.

The present invention may increase image encoding/decoding efficiency using motion information of a reference block by removing data dependency in deriving motion information of a block targeted for encoding/decoding on a per-sub prediction unit basis.

BRIEF DESCRIPTION OF DRAWINGS

FIGS. 16a to 16g are views schematically illustrating another exemplary process of deriving motion information using motion information stored in a storage space.

DETAILED DESCRIPTION OF EXEMPLARY EMBODIMENTS

Hereinafter, embodiments of the present invention are described in detail with reference to the accompanying drawings. When determined to make the subject matter of the present disclosure unclear, a detailed description of relevant know configurations or functions are omitted.

When a component is "connected to" or "coupled to" another component, the component may be directly connected or coupled to the other component, or other components may intervene. As used herein, the present invention "includes" or "comprises" a particular component, the present invention does not exclude other components, and rather additional components may also be included in the technical spirit of the present invention or embodiments of the present invention.

The terms "first" and "second" may be used to describe various components, but the components are not limited by the terms. These terms are used only to distinguish one component from another. For example, without departing from the scope of the present invention, a first component may be denoted a second component, and a second component may be denoted a first component.

The components as used herein may be independently shown to represent their respective distinct features, but this does not mean that each component should be configured as a separate hardware or software unit. In other words, the components are shown separately from each other for ease of description. At least two of the components may be combined to configure a single component, or each component may be split into a plurality of components to perform a function. Such combination or separation also belongs to the scope of the present invention without departing from the gist of the present invention.

Some components may be optional components for enhancing performance rather than inevitable components for performing essential functions of the present invention. The present invention may be implemented only with essential components to realize the gist of the present invention excluding components used to enhance performance, and such configuration also belongs to the scope of the present invention.

A 3D image offers a stereoscopic effect through a 3D stereoscopic display as if the user sees and feels in the real-life world. In this connection, a joint standardization group, JCT-3V (The Joint Collaborative Team on 3D Image Coding Extension Development), of MPEG (Moving Picture Experts Group) in ISO/IEC and VCEG (Video Coding Experts Group) in ITU-T are underway for 3D image standardization.

Figure 1:
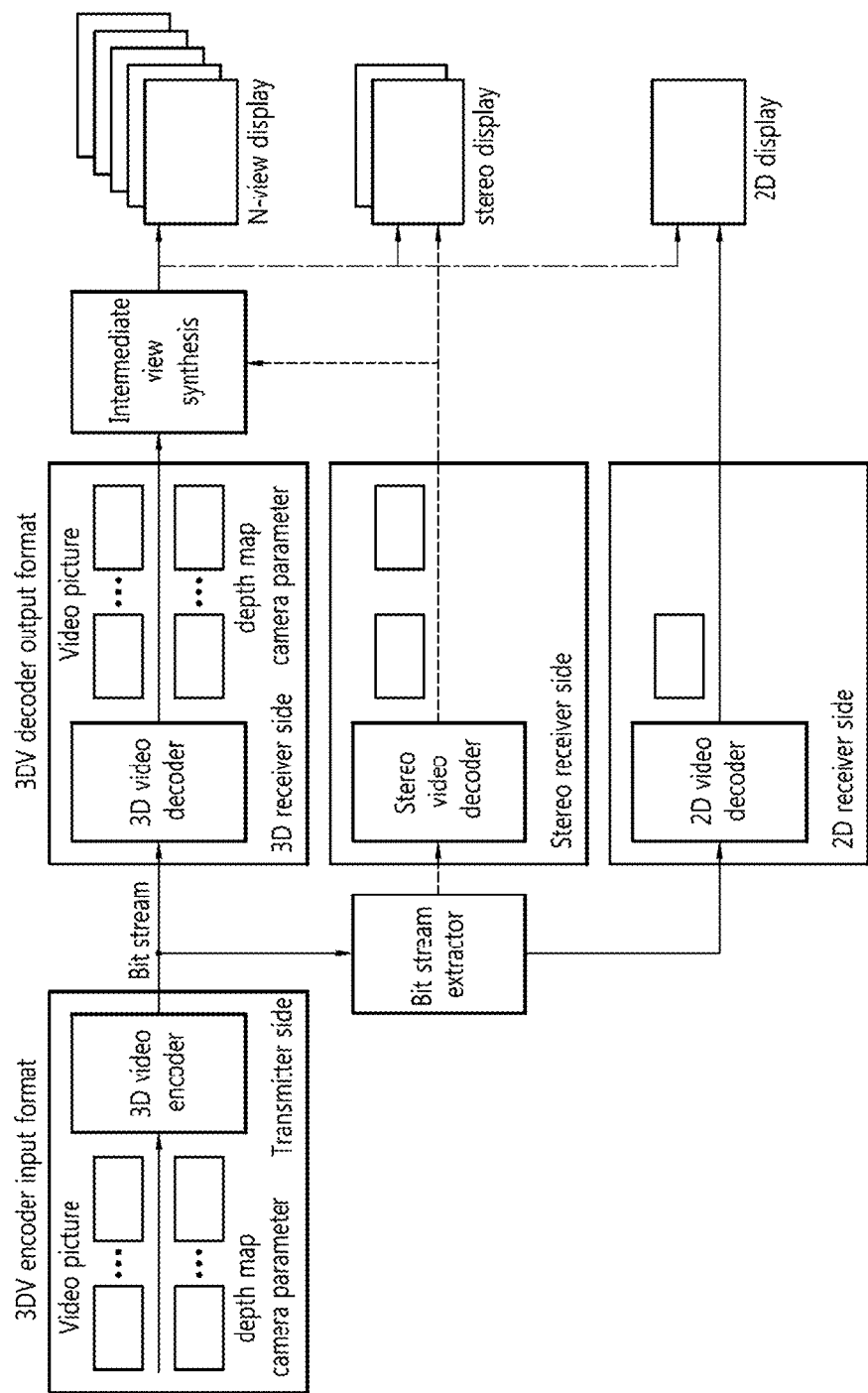
FIG. 1 is a view schematically illustrating a basic structure of a 3-dimensional (3D) image system.

FIG. 1 is a view schematically illustrating a basic structure of a 3-dimensional (3D) image system.

Referring to FIG. 1, the 3D video (3VD) system may include a sender and a receiver. In this case, the 3D video system of FIG. 1 may be a basic 3D video system as considered in 3D image standards that may include standards regarding advanced data formats and their related technologies that may support playback of autostereoscopic images as well as stereoscopic images using a texture and its corresponding depth information map.

The sender may generate a multi-view image content. Specifically, the sender may generate image information using a stereo camera and a multi-view camera and a depth information map (or depth view) using a depth information camera. The sender may convert a 2D image into a 3D image using a transforming device. The sender may generate an N (≥2)-view (i.e., multi-view) image content using the generated image information and the depth information map. In this case, the N-view image content may contain N-view image information, its depth map information, and camera-related additional information. The N-view image content may be compressed by a 3D image encoder using a multi-view image encoding scheme, and the compressed image content (a bit stream) may be transmitted through a network to a terminal of the receiver.

The receiver may decode the image content received from the sender and may provide the multi-view image. Specifically, an image decoder (e.g., a 3D image decoder, a stereo image decoder, or a 2D image decoder) of the receiver may decode the received bit stream using a multi-view image decoding scheme to restore the bit stream into the N-view image. In this case, it may generate N (or more)-view virtual view images using the restored N-view image and a depth image-based rendering (DIBR) process. The generated N (or more)-view virtual view images are played by various 3D displays (e.g., an N-view display, a stereo display, or a 2D display), providing the user with a 3D effect.

Figure 2:
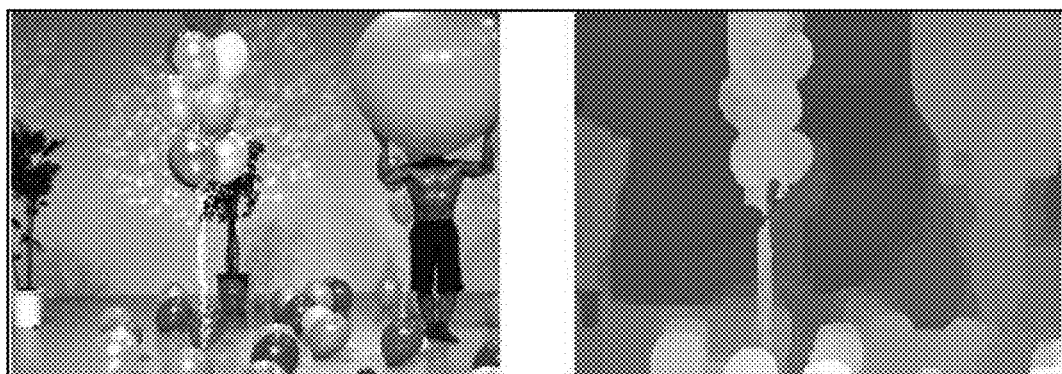
FIG. 2 is a view illustrating an example of a "balloons" image and an example of a depth information map image.

FIG. 2 is a view illustrating an example of a "balloons" image and an example of a depth information map image.

FIG. 2(a) illustrates a "balloons" image that is adopted in an MPEG (an international standardization organization) 3D image encoding standard. FIG. 2(b) illustrates a depth information map image corresponding to the "balloons" image shown in FIG. 2(a). The depth information map image is the one obtained by representing depth information shown on the screen in eight bits per pixel.

The depth information map is used for generating virtual view images, and the depth information map is the one obtained by representing the distance between a camera and a true object in the real-life world (depth information corresponding to each pixel at the same resolution as the texture) in a predetermined number of bits. In this case, the depth information map may be obtained using the depth information map camera or using a true common image (texture).

The depth information map obtained using the depth information map camera offers high-reliable depth information primarily for a standstill object or scene, but the depth information map camera operates only within a predetermined distance. In this case, the depth information map camera may utilize a measuring scheme using a laser beam or structured light or based on time-of-flight of light (TFL).

The depth information map may be generated using atrue common image (texture) and a disparity vector as well. The disparity vector means information representing the difference in view between two common images. The disparity vector may be obtained by comparing a pixel at the current view and pixels at other views to discover the most similar one to the current view pixel and measuring the distance between the current view pixel and the most similar pixel.

The texture and its depth information map may be an image(s) obtained by one or more cameras. The images obtained by several cameras may be independently encoded and may be encoded/decoded using a typical 2D encoding/decoding codec. The images obtained by several cameras have a correlation between their views, and for higher encoding efficiency, may be thus encoded using prediction between the different views.

Figure 3:
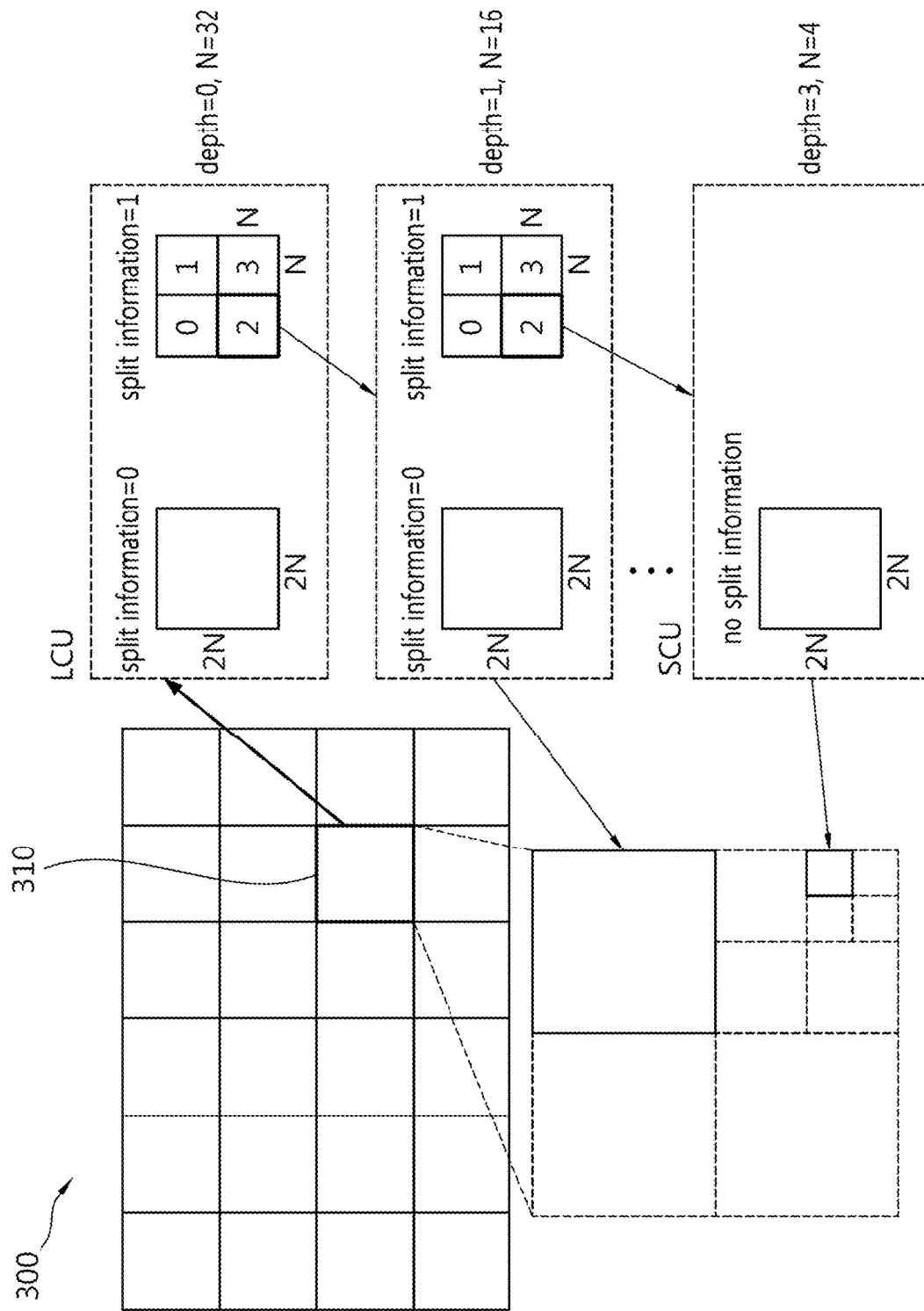
FIG. 3 is a view schematically illustrating a structure in which animage is split upon encoding and decoding the image.

FIG. 3 is a view schematically illustrating a structure in which an image is split upon encoding and decoding the image.

For efficient splitting, an image may be encoded and decoded for each coding unit (CU). The term "unit" refers to a block including a syntax element and image samples. A "unit is split" may mean that a block corresponding to the unit is split.

Referring to FIG. 3, an image 300 is sequentially split into largest coding units (LCU), and the split structure of each LCU is determined. As used herein, "LCU" may mean a coding tree unit (CTU). The split structure may mean a distribution of coding units (CU) for efficiently encoding the image in each LCU 310, and such distribution may be determined depending on whether to split one CU into four CUs each reduced in size by ½ the size of the CU in horizontal and vertical directions each. In the same manner, the split CU may be recursively split into four CUs each's size reduced to ½ thereof in horizontal and vertical directions each.

In this case, the splitting of a CU may be recursively performed to a predetermined depth. Depth information refers to information indicating the size of a CU and may be stored for each CU. For example, the depth of an LCU may be 0, and the depth of a smallest coding unit (SCU) may be a predetermined largest depth. Here, the LCU is a coding unit with the largest size as mentioned above, and the SCU is a coding unit with the smallest size.

Whenever an LCU 310 is split by half in horizontal and vertical directions each, the depth of the CU is increased by one. For example, if the size of a CU is 2N×2N at a certain depth L, the CU, if not split, has a size of 2N×2N, and if split, its size is reduced to N×N. In this case, the depth of the N×N-sized CU turns L+1. In other words, N, corresponding to the size of the CU, is reduced by half each time the depth is increased by one.

Referring to FIG. 3, the size of an LCU with a smallest depth of 0 may be 64×64 pixels, and the size of an SCU with a smallest depth of 3 may be 8×8 pixels. In this case, the depth of a CU (LCU) with 64×64 pixels may be represented as 0, a CU with 32×32 pixels as 1, a CU with 16×16 pixels as 2, and a CU (SCU) with 8×8 pixels as 3.

Further, information as to whether to split a particular CU may be represented through one-bit split information of the CU. The split information may be contained in all other CUs than SCUs. For example, if a CU is not split, 0 may be retained in the split information of the CU, and if split, 1 may be retained in the split information of the CU.

Figure 4:
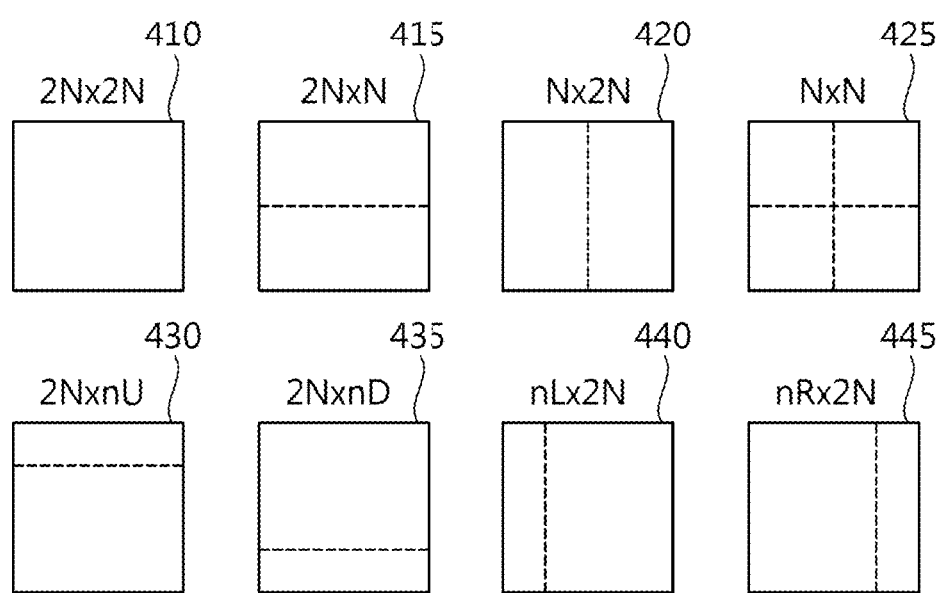
FIG. 4 illustrates prediction units that may be included in a coding unit (CU).

FIG. 4 illustrates prediction units that may be included in a coding unit (CU).

Among the CUs split from an LCU, a CU that is subjected to no further splitting may be split or partitioned into one more prediction units.

A prediction unit (hereinafter, "PU") is a basic unit in which prediction is conducted. A prediction unit is encoded and decoded in skip mode, inter mode, or intra mode. A prediction unit may be partitioned in various manners depending on the modes.

Referring to FIG. 4, the skip mode may support a 2N×2N mode 410 having the same size as a CU without splitting the CU.

The inter mode may support eight partitioned types for a CU, for example, a 2N×2N mode 410, a 2N×N mode 415, an N×2N mode 420, an N×N mode 425, a 2N×nU mode 430, a 2N×nD mode 435, an nL×2N mode 440, and an NR×2N mode 445.

The intra mode may support a 2N×2N mode 410 and an N×N mode 425 for a CU.

Figure 5:
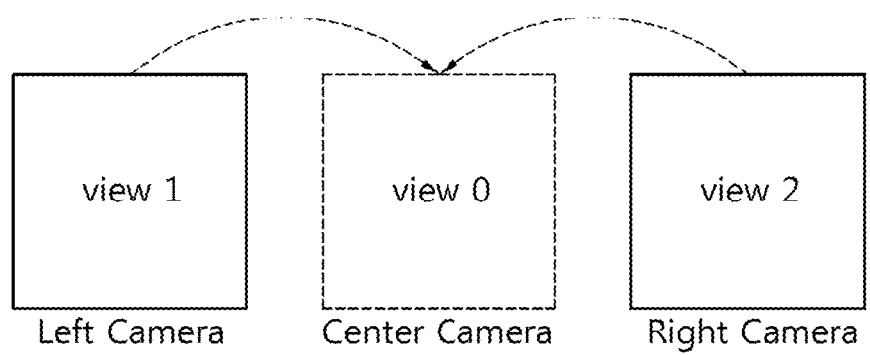
FIG. 5 illustrates an example of an inter view prediction structure in a 3D image codec.

FIG. 5 illustrates an example of an inter view prediction structure in a 3D image codec.

Inter-view prediction for view 1 and view 2 may be conducted using view 0 as a reference image, and view 0 should be encoded earlier than view 1 and view 2.

In this case, view 0 may be encoded independently from other views, and thus, view 0 is referred to as an independent view. In contrast, view 1 and view 2 that should use view 0 as reference image are referred to as dependent views. An independent view image may be encoded using a typical 2D image codec. On the contrary, dependent view images need go through inter view prediction, and thus, these views may be encoded using a 3D image codec equipped with an inter view prediction process.

For increased encoded efficiency, view 1 and view 2 may be encoded using a depth information map. For example, a texture and a depth information map, when encoded, may be encoded and/or decoded independently from each other. Or, a texture and a depth information map, when encoded, may be encoded and/or decoded dependently upon each other as shown in FIG. 6.

Figure 6:
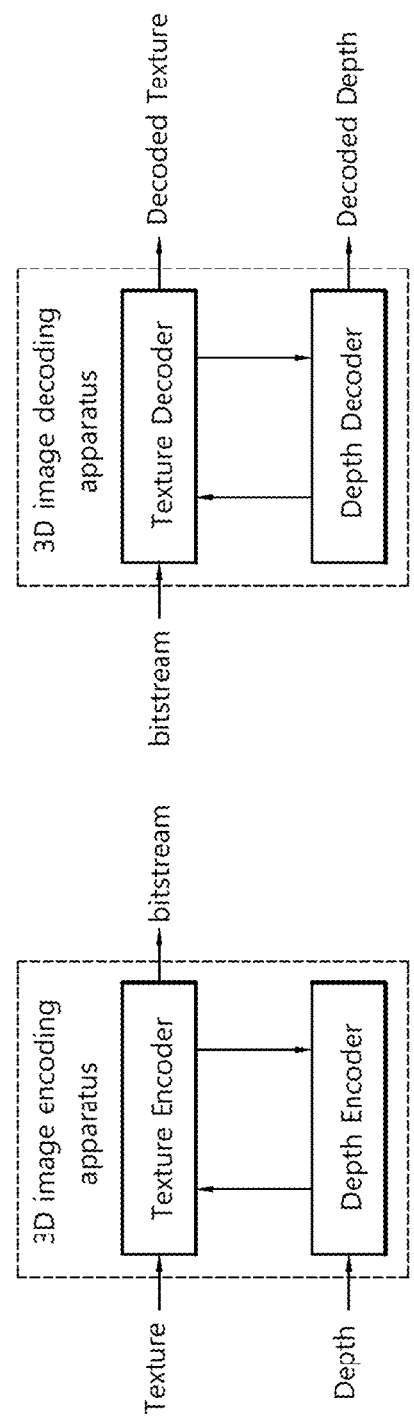
FIG. 6 illustrates an example of a process of encoding and/or decoding a trueimage (texture view) and a depth information map (depth view) in a 3D image encoder and/or decoder.

FIG. 6 illustrates an example of a process of encoding and/or decoding a trueimage (texture view) and a depth information map (depth view) in a 3D image encoder and/or decoder.

Referring to FIG. 6, the 3D image encoder may include a texture encoder (texture encoder) for encoding a trueimage (texture view) and a depth information map encoder (depth encoder) for encoding a depth information map (depth view).

In this case, the texture encoder may encode the texture using the depth information map encoded by the depth information map encoder. In contrast, the depth information map encoder may encode the depth information map using the texture encoded by the texture encoder.

The 3D image decoder may include a trueimage decoder (texture decoder) for decoding a texture and a depth information map decoder for decoding a depth information map.

In this case, the texture decoder may decode the texture using the depth information map decoded by the depth information map decoder. In contrast, the depth information map decoder may decode the depth information map using the texture decoded by the texture decoder.

Figure 7:
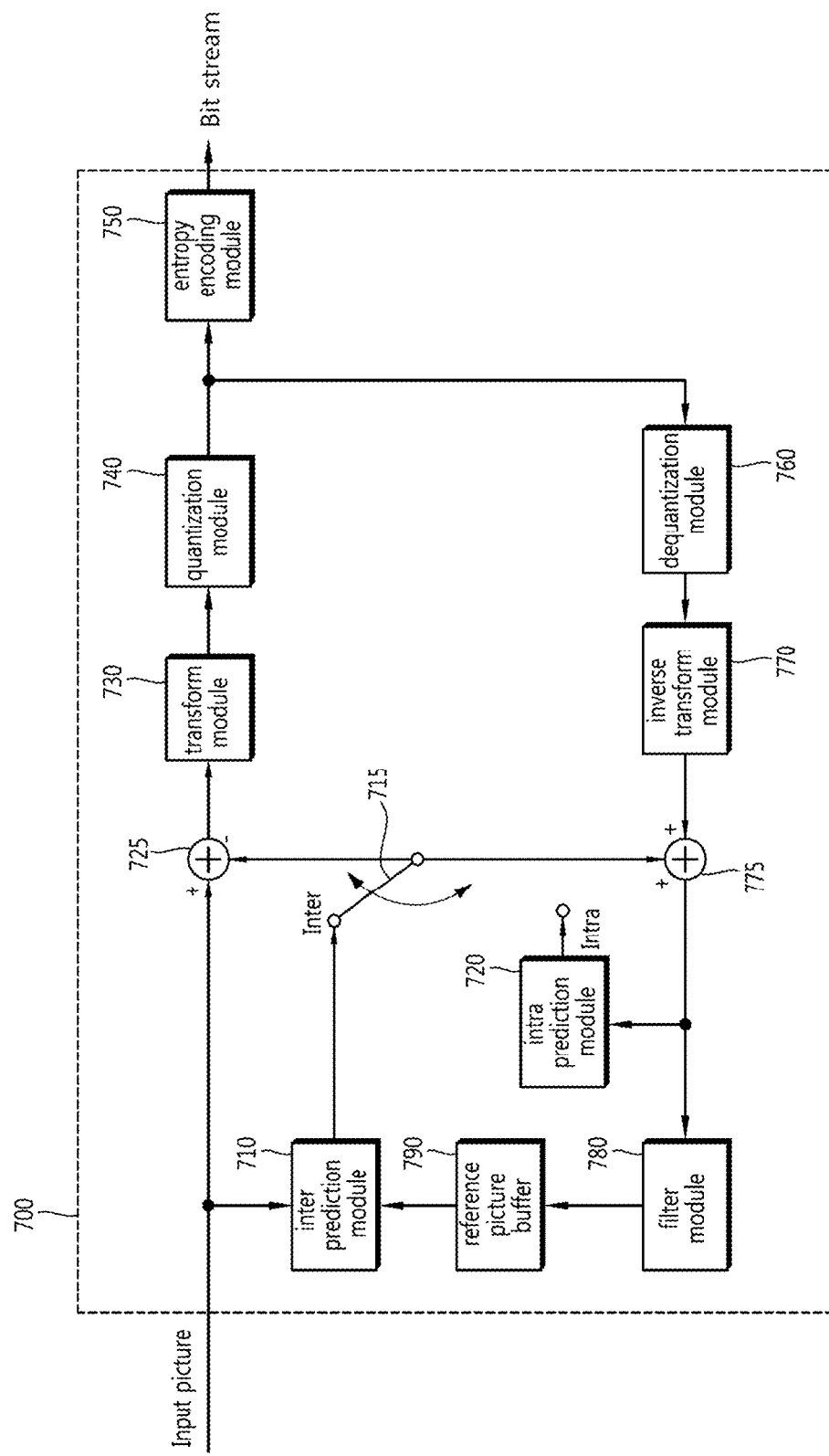
FIG. 7 is a block diagram illustrating a configuration of an image encoder according to an embodiment of the present invention.

FIG. 7 is a block diagram illustrating a configuration of an image encoder according to an embodiment of the present invention.

FIG. 7 illustrates an example image encoder applicable to a multi-view structure that may be implemented by extending a single view-structured image encoder. In this case, the image encoder of FIG. 7 may be used in a texture encoder and/or depth information map encoder as shown in FIG. 6, and the encoder may mean an encoding device.

Referring to FIG. 7, the image encoder 700 includes an inter prediction module 710, an intra prediction module 720, a switch 715, a subtractor 725, a transform module 730, a quantization module 740, an entropy encoding unit 750, an dequantization module 760, an inverse transform module 770, an adder 775, a filter 780, and a reference picture buffer 790.

The image encoder 700 may perform encoding on an input image in intra mode or inter mode to output a bitstream.

Intra prediction means intra picture prediction, and inter prediction means inter picture or inter view prediction. In intra mode, the switch 715 switches to intra mode, and in inter mode, the switch 715 switches to inter mode.

The image encoder 700 may generate a prediction block for a block (current block) of the input picture and then encode a differential between the current block and the prediction block.

In intra mode, the intra prediction module 720 may use as its reference pixel a pixel value of an already encoded neighboring block of the current block. The intra prediction module 720 may generate prediction samples for the current block using the reference pixel.

In inter mode, the inter prediction module 710 may obtain a motion vector specifying a reference block corresponding to the input block (current block) in a reference picture stored in the reference picture buffer 790. The inter prediction module 710 may generate the prediction block for the current block by performing motion compensation using the reference picture stored in the reference picture buffer 790 and the motion vector.

In a multi-view structure, inter prediction applying to inter mode may include inter view prediction. The inter prediction module 710 may configure an inter view reference picture by sampling a reference view picture. The inter prediction module 710 may conduct inter view prediction using a reference picture list including the inter view reference picture. A reference relation between views may be signaled through information specifying inter view dependency.

Meanwhile, in case the current view picture and the reference view picture have the same size, sampling applying to the reference view picture may mean generation of a reference sample by sample copying or interpolation from the reference view picture. In case the current view picture and the reference view picture have different sizes, sampling applying to the reference view picture may mean upsampling or downsampling. For example, in case views have different resolutions, a restored picture of the reference view may be upsampled to configure an inter view reference picture.

Which view picture is to be used to configure an inter view reference picture may be determined considering, e.g., encoding costs. The encoder may send to a decoding device information specifying a view to which a picture to be used as an inter view reference picture belongs.

A picture used to predict the current block in a view referenced in inter view prediction—that is, reference view—may be the same as a picture of the same access unit (AU) as the current picture (picture targeted for prediction in the current view).

The subtractor 725 may generate a residual block (residual signal) by a differential between the current block and the prediction block.

The transform module 730 transforms the residual block into a transform coefficient. In transform skip mode, the transform module 730 may skip the conversion of the residual block.

The quantization module 740 quantizes the transform coefficient into a quantized coefficient according to quantization parameters.

The entropy encoding unit 750 entropy-encodes the values obtained by the quantization module 740 or encoding parameters obtained in the course of encoding into a bitstream according to a probability distribution. The entropy encoding unit 750 may also entropy-encode information (e.g., syntax element) for image decoding in addition to the pixel information of the image.

The encoding parameters may include, as information necessary for encoding and decoding, information inferable in the course of encoding or decoding, as well as information such as syntax element encoded by the encoder and transferred to the decoding device.

The residual signal may mean a difference between the original signal and the prediction signal, a signal obtained by transforming the difference between the original signal and the prediction signal, or a signal obtained by transforming the difference between the original signal and the prediction signal and quantizing the transformed difference. From a block perspective, the residual signal may be denoted a residual block.

In case entropy encoding applies, symbols may be represented in such a way that a symbol with a higher chance of occurrence is assigned fewer bits while another with a lower chance of occurrence is assigned more bits, and accordingly, the size of a bitstream for symbols targeted for encoding may be reduced. As such, image encoding may have an increased compression capability through entropy encoding.

Entropy encoding may employ an encoding scheme such as exponential Golomb, context-adaptive variable length coding (CAVLC), or context-adaptive binary arithmetic coding (CABAC). For example, the entropy encoding unit 750 may perform entropy encoding using a variable length coding/code (VLC) table. The entropy encoding unit 750 may derive a binarization method and a target symbol and a probability model of the target symbol/bin and may perform entropy encoding using the derived binarization method and probability model.

The quantized coefficient may be inverse-quantized by the dequantization module 760 and may be inverse transformed by the inverse transform module 770. The inverse-quantized and inverse-transformed coefficient is added to the prediction block by the adder 775, thus producing a restored block.

The restored block goes through the filter 780. The filter 780 may apply at least one or more of a deblocking filter, a sample adaptive offset (SAO), and an adaptive loop filter (ALF) to the restored block or restored picture. The restored block, after having gone through the filter 780, may be stored in the reference picture buffer 790.

Figure 8:
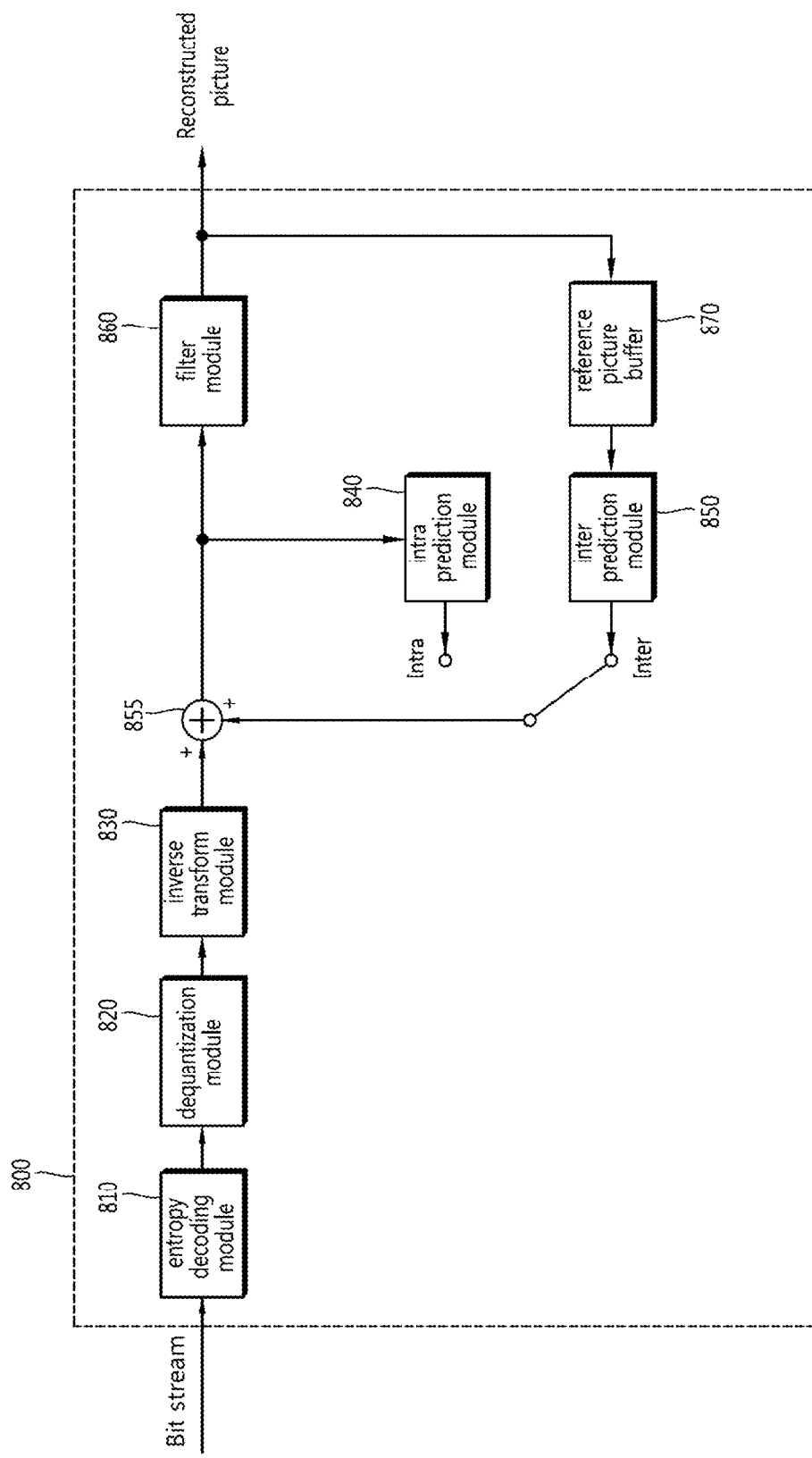
FIG. 8 is a block diagram illustrating a configuration of an image decoder according to an embodiment of the present invention.

FIG. 8 is a block diagram illustrating a configuration of an image decoder according to an embodiment of the present invention.

FIG. 8 illustrates an example image decoder applicable to a multi-view structure that may be implemented by extending a single view-structured image decoder.

In this case, the image decoder of FIG. 8 may be used in a texture decoder and/or depth information map decoder as shown in FIG. 6. For ease of description, as used herein, the terms "decrypting" and "decoding" may be interchangeably used, or the terms "decoding device" and "decoder" may be interchangeably used.

Referring to FIG. 8, the image decoder 800 includes an entropy decoding unit 810, an dequantization module 820, an inverse-transform module 830, an intra prediction module 840, an inter prediction module 850, a filter 860, and a reference picture buffer 870.

The image decoder 800 may receive the bitstream from the encoder, decode the bitstream in intra mode or inter mode, and output a reconstructed image, i.e., a reconstructed image.

In intra mode, the switch may switch to intra prediction, and in inter mode, the switch may switch to inter prediction.

The image decoder 800 may obtain a residual block restored from the received bitstream, generate a prediction block, and add the restored residual block and the prediction block to generate a reconstructed block, i.e. restored block.

The entropy decoding unit 810 may entropy-decode the received bitstream according to a probability distribution into information such as a quantized coefficient and syntax element.

The quantized coefficient is inverse-quantized by the dequantization module 820 and is inverse transformed by the inverse transform module 830. The quantized coefficient may be inverse-quantized/inverse-transformed into a restored residual block.

In intra mode, the intra prediction module 840 may generate a prediction block for the current block using a pixel value of an already encoded neighboring block of the current block.

In inter mode, the inter prediction module 850 may generate the prediction block for the current block by performing motion compensation using the reference picture stored in the reference picture buffer 870 and the motion vector.

In a multi-view structure, inter prediction applying to inter mode may include inter view prediction. The inter prediction module 850 may configure an inter view reference picture by sampling a reference view picture. The inter prediction module 850 may conduct inter view prediction using a reference picture list including the inter view reference picture. A reference relation between views may be signaled through information specifying inter view dependency.

Meanwhile, in case the current view picture (current picture) and the reference view picture have the same size, sampling applying to the reference view picture may mean generation of a reference sample by sample copying or interpolation from the reference view picture. In case the current view picture and the reference view picture have different sizes, sampling applying to the reference view picture may mean upsampling or downsampling.

For example, in case inter view prediction applies to views with different resolutions, a restored picture of the reference view may be upsampled to configure an inter view reference picture.

In this case, information specifying a view to which a picture to be used as an inter view reference picture belongs may be transmitted from the encoder to the decoder.

A picture used to predict the current block in a view referenced in inter view prediction—that is, reference view—may be the same as a picture of the same access unit (AU) as the current picture (picture targeted for prediction in the current view).

The restored residual block and the prediction block are added by the adder 855 into a restored block. In other words, the residual sample and the prediction sample are added to each other into a restored sample or restored picture.

The restored picture is filtered by the filter 860. The filter 860 may apply at least one or more of a deblocking filter, an SAO, and an ALF to the restored block or restored picture. The filter 860 outputs a reconstructed (modified) or filtered restored picture (reconstructed picture). The reconstructed image is stored in the reference picture buffer 870 for use in inter prediction.

Although in the embodiment described in connection with FIGS. 7 and 8 the modules perform their respective functions different from each other, the present invention is not limited thereto. For example, one module may perform two or more functions. For example, the respective operations of the intra prediction module and the inter prediction modules as shown in FIGS. 7 and 8 may be carried out by one module (a predicting unit).

Meanwhile, as described above in connection with FIGS. 7 and 8, one encoder/decoder performs encoding/decoding on all of the multiple views. However, this is merely for ease of description, and separate encoders/decoders may be configured for the multiple views, respectively.

In such case, the encoder/decoder for the current view may perform encoding/decoding on the current view using information regarding other view. For example, the predicting unit (inter prediction module) for the current view may perform intra prediction or inter prediction on the current block using the pixel information or restored picture information of other view.

Although inter view prediction is described herein, a current layer may be encoded/decoded using information on other view regardless of whether an encoder/decoder is configured for each view or one device processes multiple views.

The description of views according to the present invention may apply likewise to layers supportive to scalability. For example, the view as described herein may be a layer.

Figure 9:
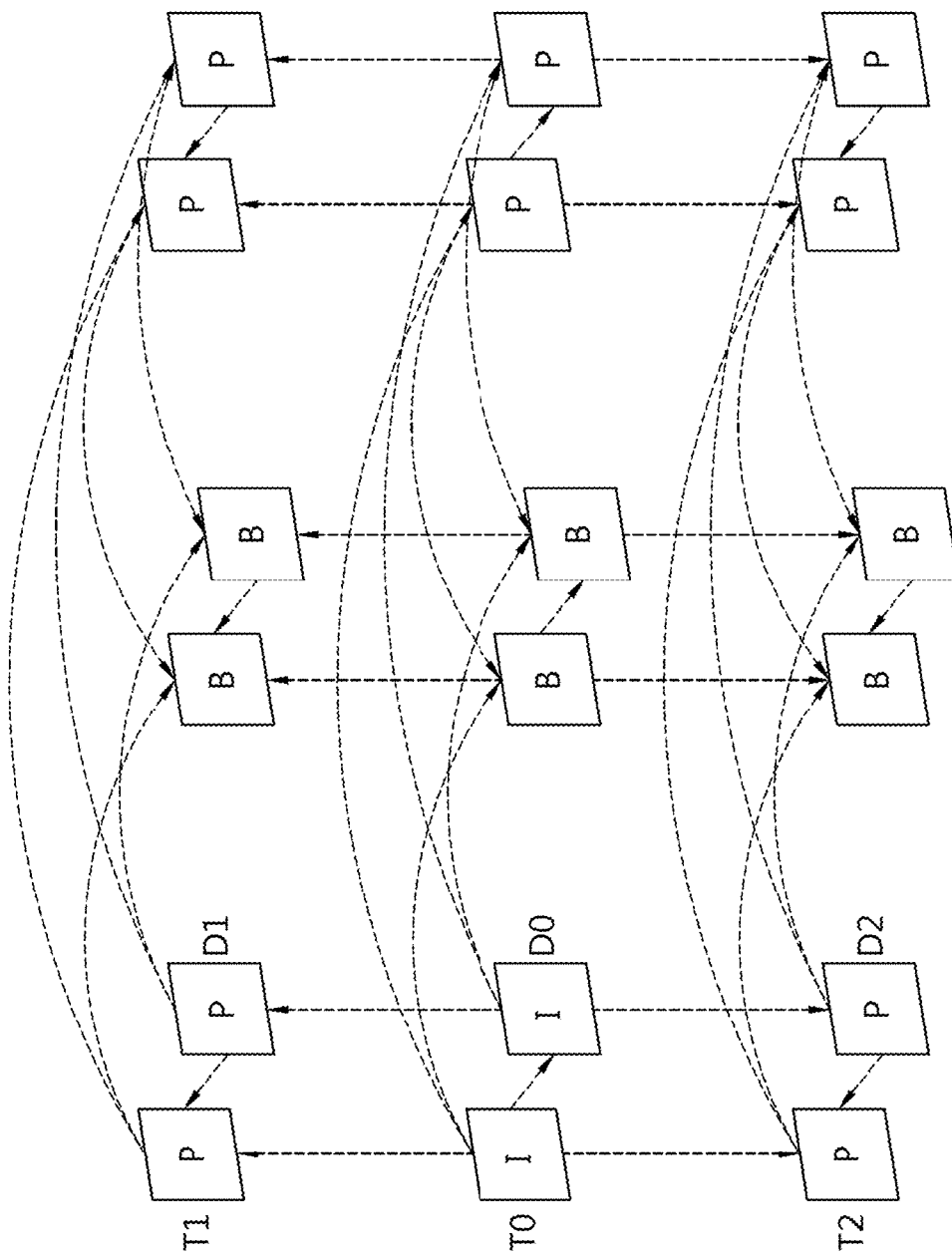
FIG. 9 is a view illustrating an exemplary prediction structure for a 3D image codec.

FIG. 9 is a view illustrating an exemplary prediction structure for a 3D image codec. For ease of description, FIG. 9 illustrates a prediction structure for encoding textures obtained by three cameras and depth information maps respectively corresponding to the textures.

As shown in FIG. 9, the three textures respectively obtained from the three cameras are denoted T0, T1, and T2 according to views, and the three depth information maps respectively corresponding to the three textures are denoted D0, D1, and D2 according to the views. Here, T0 and D0 are images obtained at view 0, T1 and D1 at view 1, and T2 and D2 at view 2. In this case, the squares shown in FIG. 9 are images (pictures).

The images (pictures) are classified into I pictures (intra pictures), P pictures (uni-prediction pictures), and B pictures (bi-prediction pictures) depending on encoding/decoding types, and each picture may be encoded/decoded depending on its encoding/decoding type. For I pictures, images themselves are encoded without going through inter prediction. For P pictures, only uni-directionally present reference images may be subjected to inter prediction, and for B pictures, bi-directionally present reference images may be subjected to inter prediction. In this case, the arrows shown in FIG. 9 denote directions of prediction. In other words, a texture and its depth information map may be co-dependently encoded/decoded depending on prediction directions.

Motion information on the current block is needed to encode/decode an image through inter prediction. To infer the motion information on the current block, the following may come in use: a method using motion information on a block adjacent to the current block, a method using a temporal correlation within the same time, and a method using an inter-view correlation at a neighboring time. The above-described inter prediction methods may be used in combination for one picture. Here, the current block refers to a block where prediction is performed. The motion information may mean a motion vector, a reference image number, and/or a prediction direction (e.g., whether it is uni-directional prediction or bi-directional prediction, whether it uses a temporal correlation, or whether an inter-view correlation is used, etc.).

In this case, the prediction direction may be typically classified into uni-directional prediction or bi-directional prediction depending on whether a reference picture list (RefPicList) is used or not. The bi-directional prediction is classified into forward prediction (Pred_L0: Prediction L0) using a forward reference picture list (LIST 0, L0) and backward prediction (Pred_L1: Prediction L1) using a backward reference picture list (LIST 1, L1). Further, the bi-directional prediction Pred_BI: Prediction BI) using both the forward reference picture list (LIST 0) and the backward reference picture list (LIST 1) may indicate that there is both forward prediction and backward prediction. Even the case where the forward reference picture list (LIST 0) is copied to the backward reference picture list (LIST 1) so that two processes of forward prediction are present may also belong to the category of bi-directional prediction.

A prediction direction may be defined using predFlagL0 and predFlagL1. In this case, predFlagL0 is an indicator indicating whether the forward reference picture list (List 0) is used, and predFlag1 is an indicator indicating whether the backward reference picture list (List 1) is used. For example, in the case of uni-directional prediction and forward prediction, predFlagL0 may be '1', and predFlagL1 may be '0'; in the case of uni-directional prediction and backward prediction, predFlagL0 '0,' and predFlagL1 '1;' and in the case of bi-directional prediction, predFlagL0 '1,' and predFlagL1 '1.'

Figure 10:
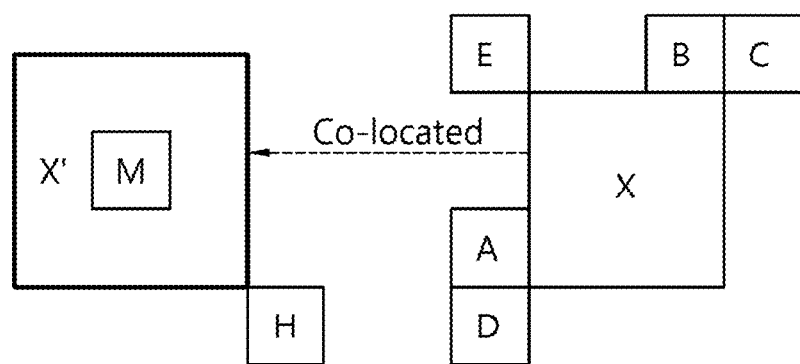
FIG. 10 illustrates an example in which neighboring blocks are used to configure a merge candidate list for a current block.

FIG. 10 illustrates an example in which neighboring blocks are used to configure a merge candidate list for a current block.

Merge mode is a method for performing inter prediction. Merge mode may employ motion information on neighboring blocks of a current block as motion information on the current block (for example, at least one of a motion vector, a reference picture list, and a reference picture index). In this case, the use of the motion information on the neighboring blocks as motion information on the current block is referred to as merging, motion merging, or merging motion.

In merge mode, per-coding unit (CU) merging motion and per-prediction unit (PU) merging motion are possible.

The case where merging motion is made on a per-block (e.g., CU or PU) basis (for ease of description, hereinafter "block") requires information regarding whether the merging motion is performed per block partition and information regarding which one of neighboring blocks of the current block the merging motion is done with.

A merge candidate list may be configured to perform merging motion.

The merge candidate list refers to a list of pieces of motion information, and this may be generated before merge mode is performed. Here, the motion information of the merge candidate list may be motion information on the neighboring blocks of the current block or motion information newly created by combining the pieces of motion information already present in the merge candidate list. The motion information on the neighboring blocks (for example, a motion vector and/or reference picture index) may be motion information specified by the neighboring blocks or motion information stored in the neighboring blocks (or used to decode the neighboring blocks).

In this case, the neighboring blocks, as shown in FIG. 10, may include neighboring blocks A, B, C, D and E positioned spatially adjacent to the current block and a co-located candidate block H or M temporally corresponding to the current block. The co-located candidate block refers to a block located at a corresponding position in a co-located picture temporally corresponding to the current picture including the current block. If the H block is available in the co-located picture, the H block may be determined as the co-located candidate block, and if unavailable, the M block in the co-located picture may be determined as the co-located candidate block.

Upon configuring the merge candidate list, it is determined whether the motion information on the neighboring blocks (A, B, C, D, and E) and the co-located candidate block (H or M) may be used as merge candidate to configure the merge candidate list of the current block. In other words, motion information on blocks available for inter prediction of the current block may be added to the merge candidate list as merge candidate.

For example, as a method for configuring a merge candidate list for an X block, 1) in case a neighboring block A is available, the neighboring block A is added to the merge candidate list. 2) thereafter, only when the motion information on neighboring block B is not the same as the motion information on neighboring block A, neighboring block B is added to the merge candidate list. 3) in the same manner, only when the motion information on neighboring block C differs from the motion information on neighboring block B, neighboring block C is added to the merge candidate list, and 4) only when the motion information on neighboring block D differs from the motion information on neighboring block C, neighboring block D is added to the merge candidate list. Further, 5) only when the motion information on neighboring block E is different from the motion information on neighboring block D, neighboring block E may be added to the merge candidate list, and 6) finally, neighboring block H (or M) is added to the merge candidate list. In sum, the neighboring blocks may be added to the merge candidate list in the order of A→B→C→D→E→H(or M). Here, the same motion information may mean using the same motion vector, the same reference picture, and the same prediction direction (uni-directional or bi-directional).

The phrases "adding a neighboring block to a merge candidate list as merge candidate" and "adding motion information to a merge candidate list as merge candidate" are mixed up herein for ease of description, although the two phrases are substantially the same in meaning. For example, a neighboring block as merge candidate may mean motion information on the block.

Figure 11:
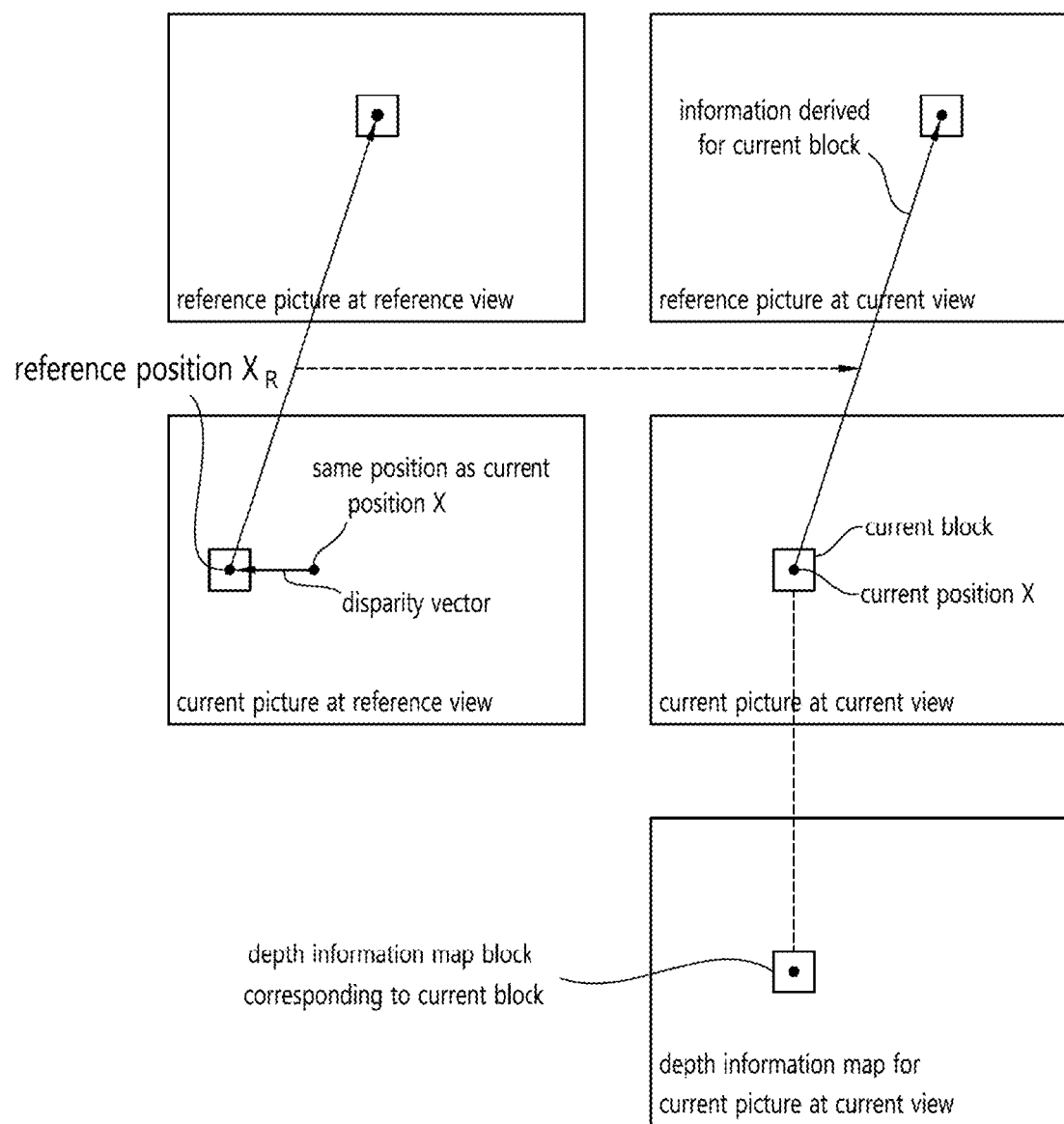
FIG. 11 is a view illustrating an exemplary process of deriving motion information on a current block using motion information at a neighboring view.

FIG. 11 is a view illustrating an exemplary process of deriving motion information on a current block using motion information at a neighboring view.

In connection with FIG. 11, only one view is used to derive the motion information on the current block merely for ease of description. However, there may be two or more neighboring views.

Referring to FIG. 11, a 3D video system may use motion information at a neighboring view in order to efficiently encode/decode motion information. Specifically, the current block shown in FIG. 11 (the block at current location X) searches a target block (reference location $X_R$) located at a neighboring view in order to derive the motion information on the current block. In this case, the target block at the neighboring view means a block corresponding to the current block. Since only a difference in current picture between the current view and the reference view lies in the position of cameras, the target block at the neighboring view may be derived from the disparity vector (DV) as described above.

Figure 12:
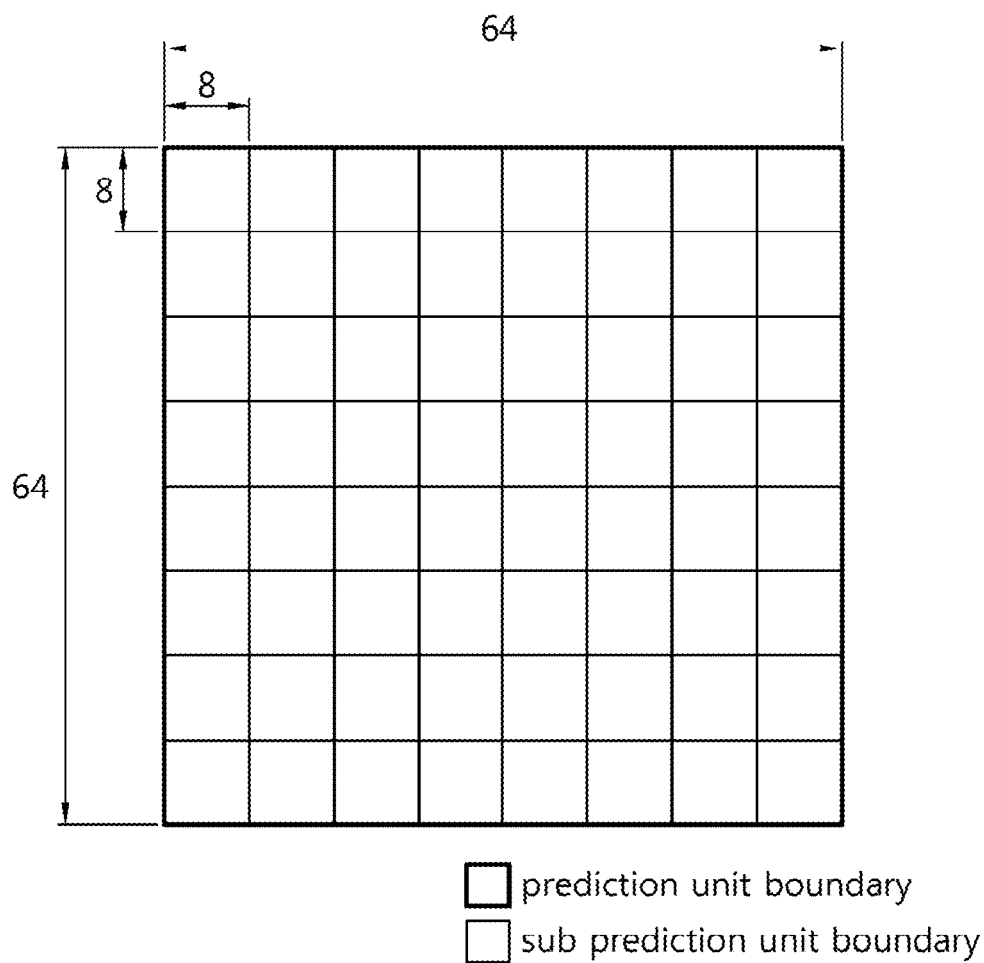
FIG. 12 is a view illustrating an example in which one prediction unit (PU) is split into several sub prediction units.

FIG. 12 is a view illustrating an example in which one prediction unit (PU) is split into several sub prediction units.

In the example illustrated in FIG. 12, a prediction unit with a size of 64×64 is divided into sub prediction units each with a size of 8×8. For ease of description in connection with FIG. 12, the size of the prediction unit is 64×64, but without limited thereto, the size may be 32×32, 16×16, 8×8, or 4×4. In a 3D video system, one prediction unit may be split into a number of sub prediction units. In this case, derivation of motion information using a disparity vector is carried out on a per-sub prediction unit basis. The sub prediction unit may have a predetermined size (e.g., 4×4, 8×8, or 16×16), and the size of the sub prediction unit may be designated upon encoding. Information on the size of the sub prediction unit may be included and signaled in an image parameter set (VPS) extension syntax.

Figure 13:
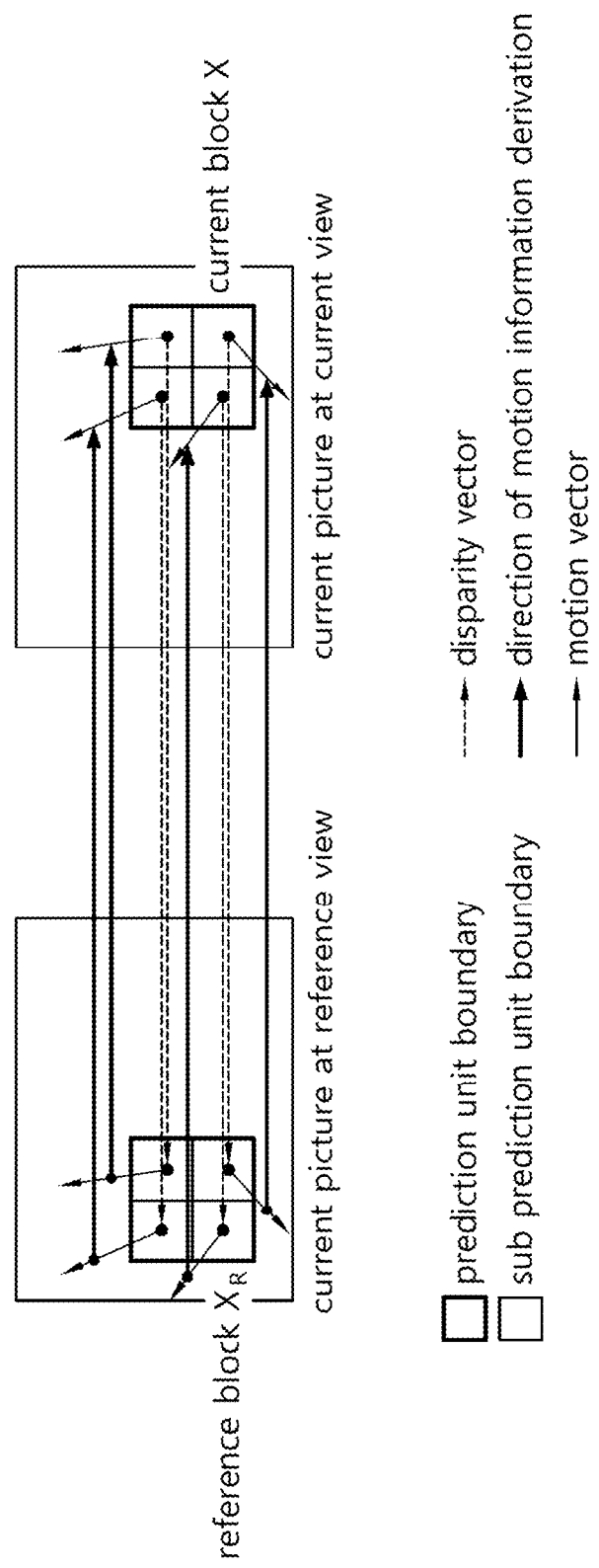
FIG. 13 is a view illustrating an exemplary process of deriving motion information on a current block using a reference block.

FIG. 13 is a view illustrating an exemplary process of deriving motion information on a current block using a reference block.

The process of deriving motion information on a current block means setting up the motion information present in the reference block with the motion information on the current block. However, a 3D video system may derive motion information on a per-sub prediction unit basis for the current block X positioned in the current picture at the current view in order to efficiently encode/decode motion information.

In other words, the 3D video system may set the motion information present in the sub prediction unit of the reference block $X_R$ to the motion information on the sub prediction unit of the current block X. In this case, the reference block $X_R$ may mean a reference block $X_R$ positioned in the current picture at the reference view. A specific process of deriving motion information is described below.

Figure 14:
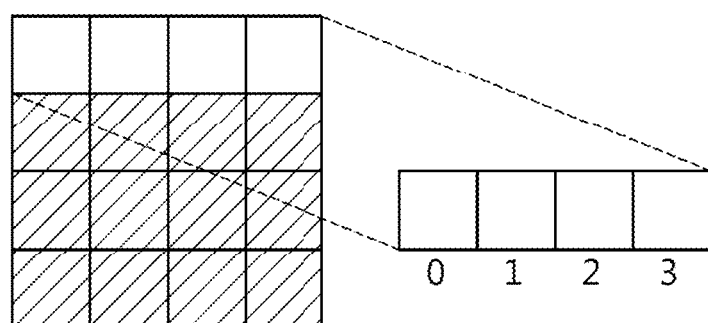
FIG. 14 is a view illustrating an exemplary reference block used to derive motion information on a current block.

FIG. 14 is a view illustrating an exemplary reference block used to derive motion information on a current block.

Referring to FIG. 14, the reference block may mean a PU, and one reference block may include a total of 16 sub prediction units. In this case, motion information on each sub prediction unit in the current block may be derived from motion information present in the sub prediction units of the reference block.

Now described is a method of deriving motion information on sub prediction units of a current block using a reference block with reference to FIGS. 15a to 15e and FIGS. 16a to 16g.

FIGS. 15a to 15e are views schematically illustrating an exemplary process of deriving motion information using motion information stored in a storage space. In this case, the reference block used in FIGS. 15a to 15e may be a reference block as shown in FIG. 14.

When the sub prediction unit of the current block brings the mi on the sub prediction units of the reference block, all of the sub prediction unit of the reference block do not have motion information. In other words, there might be some sub prediction units of the reference block from which motion information cannot be brought up. Accordingly, in case there are sub prediction units from which motion information cannot be obtained, the mi on a previous or subsequent sub prediction unit of the currently referenced sub prediction unit may be put to use in order to make up for failure to derive motion information from the sub prediction unit of the current block. For example, the motion information on a sub prediction unit available in the reference block may be previously stored in preparation for the case where there is some other sub prediction unit of the reference block from which motion information cannot be derived, so that the previously stored motion information may be inserted into the sub prediction unit of the current block to derive the motion information on the current block.

For a better understanding of the above-described method, each step of an exemplary method for deriving motion information on a sub prediction unit of a current block when a first sub prediction unit of a reference block has its motion information while a second or its subsequent sub prediction units of the reference block may not is described below with reference to the drawings.

Figure 15A:
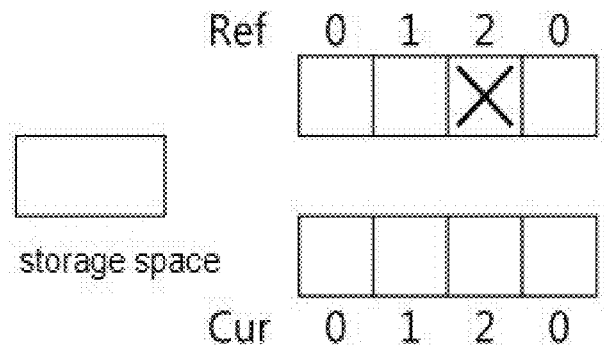
FIGS. 15a to 15e are views schematically illustrating an exemplary process of deriving motion information using motion information stored in a storage space.

FIG. 15a is a view illustrating the initial state of sub prediction units of a current block and a storage space.

Referring to FIG. 15a, Ref denotes a reference block, and Ref 0, 1, 2, and 3 respectively denote sub prediction units in the reference block. That is, Ref 0 means sub prediction unit 0 of the reference block (a first sub prediction unit of the reference block), Ref 1 sub prediction unit 1 of the reference block (a second sub prediction unit of the reference block), Ref 2 sub prediction unit 2 of the reference block (a third sub prediction unit of the reference block), and Ref 3 sub prediction unit 3 of the reference block (a fourth sub prediction unit of the reference block). Cur denotes the current block, and Cur 0, 1, 2, and 3 respectively denote sub prediction units in the current block. That is, Cur 0 means sub prediction unit 0 of the current block (a first sub prediction unit of the current block), Cur 1 sub prediction unit 1 of the current block (a second sub prediction unit of the current block), Cur 2 sub prediction unit 2 of the current block (a third sub prediction unit of the current block), and Cur 3 sub prediction unit 3 (a fourth sub prediction unit of the current block).

In this case, 'X' marked in Ref 2 of FIG. 15a denotes motion information being impossible to derive using sub prediction unit 2 of the reference block.

Figure 15B:
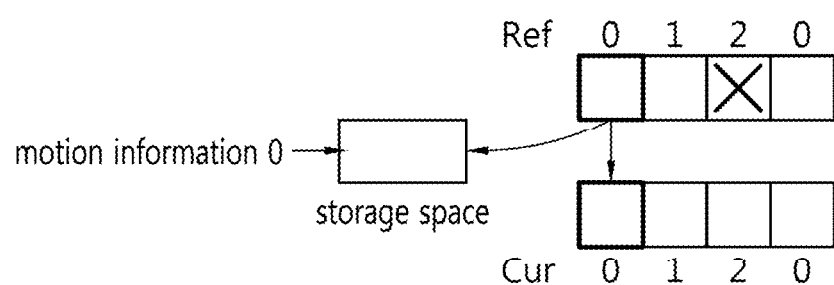

FIG. 15b shows a first step of deriving motion information from a sub prediction unit of the reference block.

Referring to FIG. 15b, motion information is derived from sub prediction unit 0 of the reference block for sub prediction unit 0 of the current block. In this case, since motion information may be derived from sub prediction unit 0 of the reference block, motion information on sub prediction unit 0 of the reference block is stored in the storage space. In this case, the motion information stored in the storage space may be defined as motion information 0, which is used when motion information cannot be derived from some other sub prediction units of the reference block.

Figure 15C:
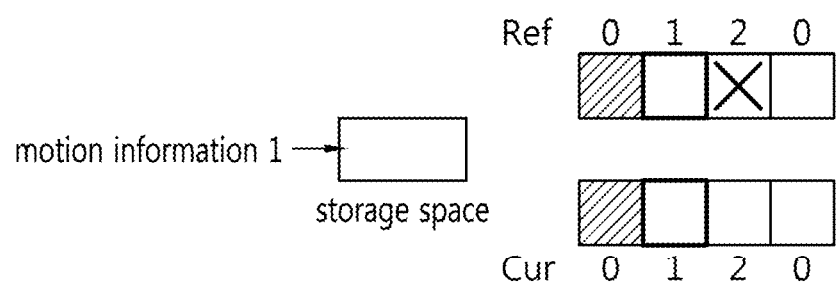

FIG. 15c shows a second step of deriving motion information from a sub prediction unit of the reference block.

Referring to FIG. 15c, motion information is derived from sub prediction unit 1 of the reference block for sub prediction unit 1 of the current block. In this case, since motion information may be derived from sub prediction unit 1 of the reference block, motion information on sub prediction unit 1 of the reference block is stored in the storage space. In this case, the stored motion information on sub prediction unit 1 may be defined as motion information 1, and motion information 1 may be stored in the storage space instead of motion information 0. Motion information 1 may be used when motion information cannot be derived from some other sub prediction unit of the reference block.

Figure 15D:
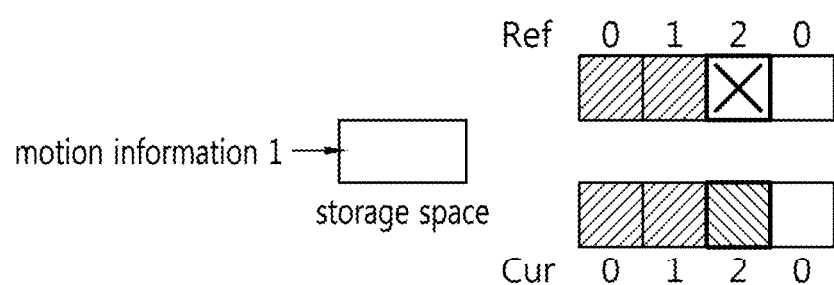

FIG. 15d shows a third step of deriving motion information from a sub prediction unit of the reference block.

Referring to FIG. 15d, an attempt is made to derive motion information from sub prediction unit 2 of the reference block for sub prediction unit 2 of the current block. However, since no motion information can be derived from sub prediction unit 2 of the reference block, motion information on sub prediction unit 2 of the current block is derived from the motion information stored in the storage space. In this case, the motion information stored in the storage space may be motion information 1.

Figure 15E:
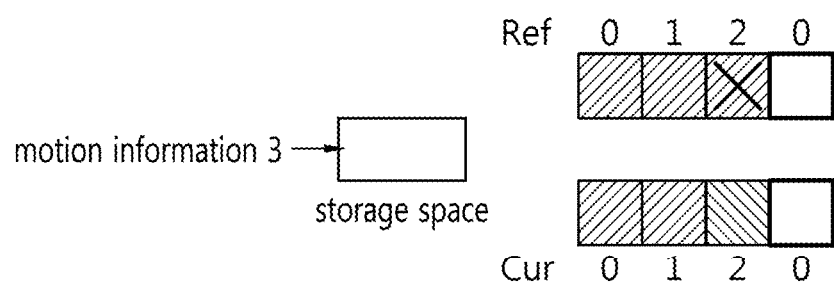

FIG. 15e shows a fourth step of deriving motion information from a sub prediction unit of the reference block.

Referring to FIG. 15e, motion information is derived from sub prediction unit 3 of the reference block for sub prediction unit 3 of the current block. In this case, since motion information may be derived from sub prediction unit 3 of the reference block, motion information on sub prediction unit 3 of the reference block is stored in the storage space. In this case, the stored motion information on sub prediction unit 3 may be defined as motion information 3, and motion information 3 may be stored in the storage space instead of motion information 1. Motion information 3 may be used when motion information cannot be derived from some other sub prediction unit of the reference block.

FIGS. 16a to 16g are views schematically illustrating another exemplary process of deriving motion information using motion information stored in a storage space.

FIGS. 16a to 16g illustrate an exemplary process of deriving motion information in the case where a sub prediction unit of the reference block comes from which motion information cannot be derived, followed by another sub prediction unit of the reference block from which motion information can be derived.

Figure 16A:
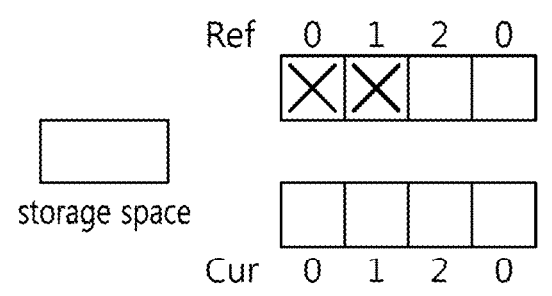

FIG. 16a is a view illustrating the initial state of sub prediction units of a current block and a storage space.

Referring to FIG. 16a, Ref denotes a reference block, and Ref 0, 1, 2, and 3 respectively denote sub prediction units in the reference block. That is, Ref 0 means sub prediction unit 0 of the reference block, Ref 1 sub prediction unit 1 of the reference block, Ref 2 sub prediction unit 2 of the reference block, and Ref 3 sub prediction unit 3 of the reference block. Cur denotes the current block, and Cur 0, 1, 2, and 3 respectively denote sub prediction units in the current block. That is, Cur 0 means sub prediction unit 0 of the current block, Cur 1 sub prediction unit 1 of the current block, Cur 2 sub prediction unit 2 of the current block, and Cur 3 sub prediction unit 3 of the current block. In this case, 'X' marked in Ref 0 of FIG. 16a denotes motion information being impossible to derive using sub prediction unit 0 of the reference block and sub prediction unit 1 of the reference block.

Figure 16B:
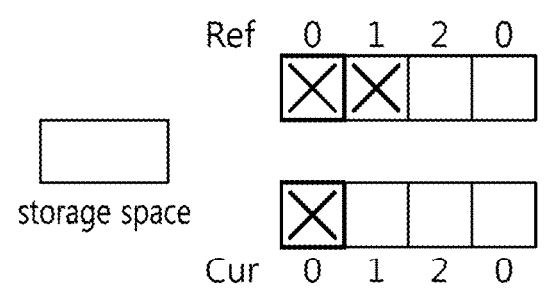

FIG. 16b shows a first step of deriving motion information from a sub prediction unit of the reference block.

Referring to FIG. 16b, an attempt is made to derive motion information from sub prediction unit 0 of the reference block for sub prediction unit 0 of the current block. However, as described above, no motion information can be derived from sub prediction unit 0 of the reference block, nor is there motion information stored in the storage space. Accordingly, a second step is performed.

Figure 16C:
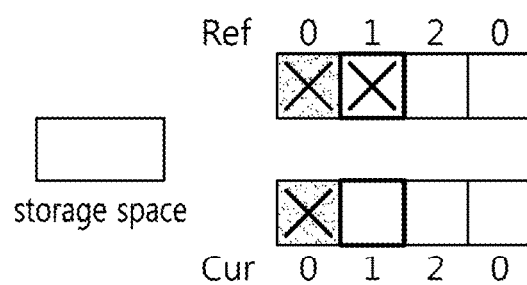

FIG. 16c shows a second step of deriving motion information from a sub prediction unit of the reference block.

Referring to FIG. 16c, an attempt is made to derive motion information from sub prediction unit 1 of the reference block for sub prediction unit 1 of the current block. However, as described above, no motion information can be derived from sub prediction unit 1 of the reference block, nor is there motion information stored in the storage space. Accordingly, a third step is performed.

Figure 16D:
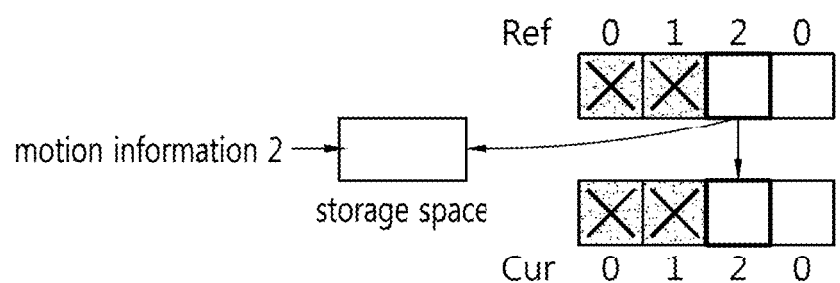

FIG. 16d shows a third step of deriving motion information from a sub prediction unit of the reference block.

Referring to FIG. 16d, motion information is derived from sub prediction unit 2 of the reference block for sub prediction unit 2 of the current block. In this case, since motion information may be derived from sub prediction unit 2 of the reference block, motion information on sub prediction unit 2 of the reference block is stored in the storage space. In this case, the motion information stored in the storage space may be defined as motion information 2, which is used when motion information cannot be derived from some other sub prediction units of the reference block.

Figure 16E:
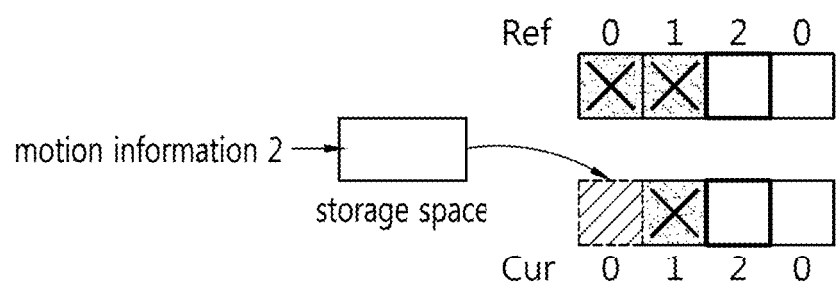

FIG. 16e shows a fourth step of deriving motion information from a sub prediction unit of the reference block.

Referring to FIG. 16e, motion information is derived using motion information 2 stored in the storage space for sub prediction unit 0 of the current block.

Figure 16F:
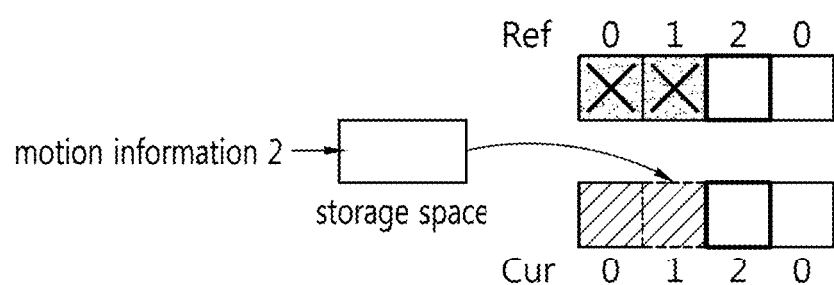

FIG. 16f shows a fifth step of deriving motion information from a sub prediction unit of the reference block.

Referring to FIG. 16f, motion information is derived using motion information 2 stored in the storage space for sub prediction unit 1 of the current block.

Figure 16G:
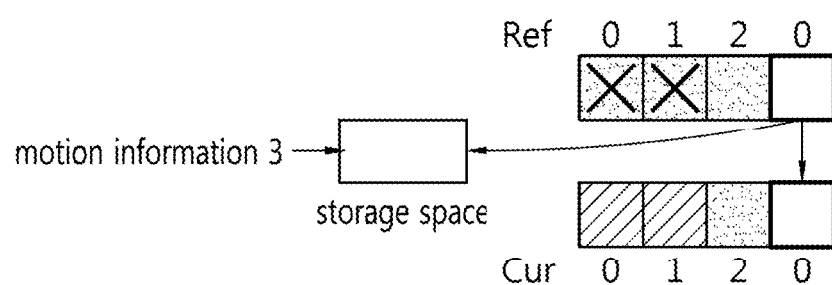

FIG. 16g shows a sixth step of deriving motion information from a sub prediction unit of the reference block.

Referring to FIG. 16g, motion information is derived from sub prediction unit 3 of the reference block for sub prediction unit 3 of the current block. In this case, since motion information may be derived from sub prediction unit 3 of the reference block, motion information on sub prediction unit 3 of the reference block is stored in the storage space. In this case, the stored motion information on sub prediction unit 3 may be defined as motion information 3, and motion information 3 may be stored in the storage space instead of motion information 2. Motion information 3 may be used when motion information cannot be derived from some other sub prediction unit of the reference block.

Figure 17:
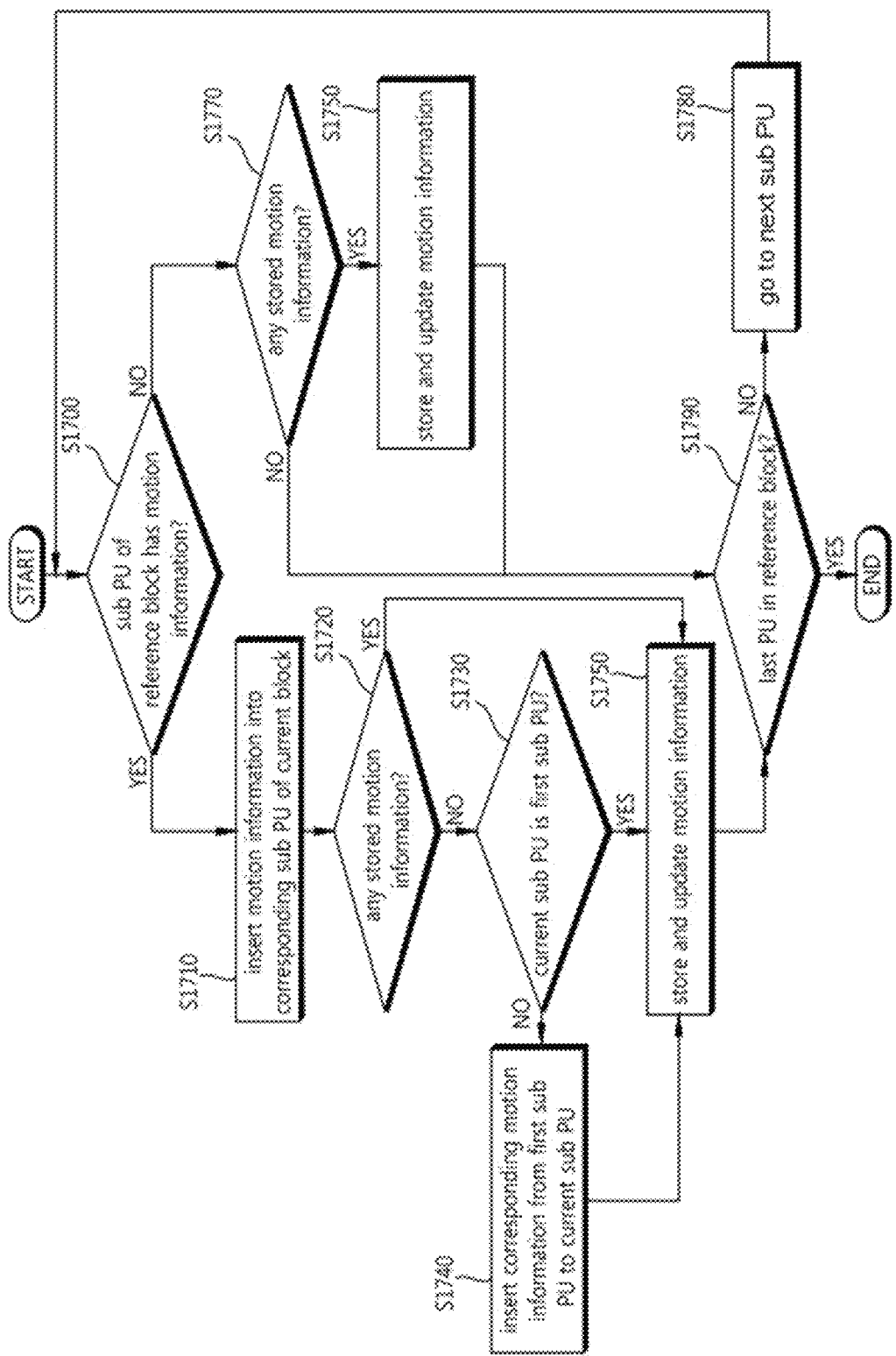
FIG. 17 is a flowchart illustrating a method of deriving motion information on a sub prediction unit of a current block using a sub prediction unit of a reference block, according to an embodiment of the present invention.

FIG. 17 is a flowchart illustrating a method of deriving motion information on a sub prediction unit of a current block using a sub prediction unit of a reference block, according to an embodiment of the present invention. Each operation in the process of FIG. 17 may be performed by an encoder and/or a decoder or an inter prediction module in the encoder and/or decoder, for example, the intra prediction module 720 of FIG. 7 or the inter prediction module 850 of FIG. 8.

A process when a sub prediction unit of a reference block has its motion information is first described with reference to FIG. 17. The inter prediction module determines whether the sub prediction unit of the reference block has motion information (S1700).

The inter prediction module, if the sub prediction unit of the reference block has motion information, inserts the motion information present in the sub prediction unit of the reference block into a sub prediction unit of a current block which is targeted for deriving motion information (S1710).

Thereafter, the inter prediction module determines whether the storage space stores motion information (S1720). If the storage space stores motion information, step S1750 is performed. In this case, the storage space has been described above in detail, so has the motion information.

Unless the storage space stores motion information, the inter prediction module determines whether the sub prediction unit of the current block, which is targeted for deriving motion information, is the first sub prediction unit of the current block (S1730). If the sub prediction unit of the current block targeted for deriving motion information is the first sub prediction unit of the current block, the inter prediction module performs step S1750.

In step S1730, unless the sub prediction unit of the current block is the first sub prediction unit, the inter prediction module inserts the motion information present in the sub prediction unit of the reference block into the sub prediction unit(s) of the current block that are positioned ahead of the first sub prediction unit of the current block. For example, if the sub prediction unit of the current block, which is targeted for deriving motion information, is the third sub prediction unit, the inter prediction module inserts the motion information on the sub prediction unit of the reference block into the first and second sub prediction units of the current block.

The inter prediction module stores (and updates the existing information in the storage space with) the motion information on the sub prediction unit of the reference block in the storage space (S1750). In this case, a specific description of storing and updating motion information has been given above.

The inter prediction module determines whether the sub prediction unit of the reference block which is targeted for deriving motion information is the last sub prediction unit of the reference block (S1790). If the sub prediction unit of the reference block which is targeted for deriving motion information is the last sub prediction unit of the reference block, the inter prediction module terminates the motion information deriving process. Unless the sub prediction unit of the reference block which is targeted for deriving motion information is the last sub prediction unit of the reference block, the inter prediction module goes to a next sub prediction unit of the reference block for processing (S1780). Thereafter, the inter prediction module repeats steps S1700 to S1790.

If no sub prediction unit of the reference block has motion information, the following process proceeds.

The inter prediction module determines whether a sub prediction unit of the reference block has motion information (S1700).

If the sub prediction unit of the reference block does not have motion information, the inter prediction module determines whether the storage space retains motion information (S1770). Unless the storage space retains motion information, the inter prediction module performs step S1790.

In case the storage space retains motion information, the inter prediction module inserts the motion information stored in the storage space into the sub prediction unit of the reference block which is targeted for deriving motion information (S1750).

After performing the above steps, the inter prediction module determines whether the sub prediction unit of the reference block which is targeted for deriving motion information is the last sub prediction unit of the reference block (S1790). If the sub prediction unit of the reference block which is targeted for deriving motion information is the last sub prediction unit of the reference block, the inter prediction module terminates the motion information deriving process. Unless the sub prediction unit of the reference block which is targeted for deriving motion information is the last sub prediction unit of the reference block, the inter prediction module goes to a next sub prediction unit of the reference block for processing (S1780). Thereafter, the inter prediction module repeats steps S1700 to S1790.

Then, the inter prediction module derives a prediction sample for the current block based on the motion information on the current block derived by the above steps. The prediction sample may mean the above-described prediction signal, and the prediction signal may mean a difference between the original signal and the residual signal as described above.

The above-described process of deriving motion information on a sub prediction unit of a current block may specifically apply to 3D images as shown in Table 1. As described above, the operation shown in Table 1 may be performed by an encoder/decoder or an inter prediction module of the encoder/decoder.

TABLE 1

This process has the following inputs.
- Position (xPb, yPb) of left and upper end of current prediction unit
- Width (nPbW) and height of current prediction unit
- Reference view index refViewIdx
- Disparity vector mvDisp
This process has the following outputs.
- Flag availableFlagLXInterView for determining whether temporal inter-view motion candidate is available, where LX may be reference picture list L0 and L1.
As used herein, 'temporal inter-view' means that a picture at a different view from that of the current picture may be referenced as a picture at other time (i.e., other POC) at the same view as the current picture.
- Temporal inter-view motion vector candidate mvLXInterView, where LX may be reference picture lists L0 and L1.
- Reference index refIdxLXInterView designating a reference picture present in reference picture list RefPicListLX, where LX may be reference picture lists L0 and L1.
LX may be reference picture lists L0 and L1. The following applies to LX.
- Flag availableFlagLXInterView is initialized as 0.
- Motion vector mvLXInterView is initialized as (0,0).
- Reference index refIdxLXInterView is initialized as −1.
Variables nSbW and nSbH are initialized as follows.
   nSbW=Min(nPbW, SubPbSize)
   nSbH=Min(nPbH, SubPbSize)
Variable ivRefPic is initialized as a picture having the same ViewIdx as refViewIdx in the current access unit. Variable curSubBlockIdx is initialized as 0, and variable lastAvailableFlag is initialized as 0.
The following applies to yBlk ranging from 0 to (nPbH/nSbH−1) and xBlk ranging from 0 to (nPbW/nSbW−1).
   - Variable curAvailableFlag is initialized as 0.
   - The following applies to X ranging from 0 to 1.
     - Flag spPredFlagL1[xBlk][yBlk] is initialized as 0.
     - Motion vector spMvLX is initialized as (0,0).
     - Reference index spRefIdxLX[xBlk][yBlk] is initialized as −1.

TABLE 1-continued

- Reference block position (xRef, yRef) is derived as follows.
  xRef=Clip3(0, PicWidthInSamplesL-1,
    xPb+xBlk*nSbW+nSbW/2+((mvDisp[0]+2)>>2))
  yRef=Clip3(0, PicHeightInSamplesL-1,
    yPb+yBlk*nSbH+nSbH/2+((mvDisp[1]+2)>>2))
- Variable ivRefPb refers to luma prediction block at (xRef, yRef) in the inter-view reference picture indicated by ivRefPic.
- (xIvRefPb, yIvRefPb) refers to the left and upper position of the reference block indicated by ivRefPb.
- Unless ivRefPb has been encoded in intra mode, the following is performed on X ranging from 0 to 1.
  - When X is 0 or current slice is slice B, the following is performed on Y ranging from X to (1−X).
    - refPixListLYIvRef, predFlagLYIvRef[x][y], mvLYIvRef[x][y], and refIdxLYIvRef[x][y], respectively, are set to RefPicListLY, PredFlagLY[x][y], MvLY[x][y], and RefIdxLY[x][y] in the picture indicated by ivRefPic.
    - If predFlagLYIvRef[xIvRefPb][yIvRefPb] is 1, the following is performed on i ranging from 0 to num_ref_idx_1X_active_minus1 (the number of reference pictures in reference picture list).
      - If POC of refPicListLYIvRef[refIdxLYIvRef[xIvRefPb][yIvRefPb]] is the same as RefPicListLX[i] and spPredFlagLX[xBlk][yBlk] is 0, the following applies.
        spMvLX[xBlk][yBlk]=mvLYIvRef[xIvRefPb][yIvRefPb]
        spRefIdxLX[xBlk][yBlk]=i
        spPredLfagLX[xBlk][yBlk]=1
        curAvailableFlag=1
The following applies according to curAvailableFlag.
- If curAvailableFlag is 1, the following order applies.
  1. If lastAvailableFlag is 0, the following applies.
    - The following applies to X ranging from 0 to 1.
      mxLXInterView=spMvLX[xBlk][yBlk]
      refIdxLXInterView=spRefIdxLX[xBlk][yBlk]
      availableFlagLXInterview=spPredFlag[xBlk][yBlk]
    - When curSubBlockIdx is larger than 0, the following applies to k ranging from 0 to (curSubBlockIdx−1).
      - Variables i and j are derived as follows.
        i=k%(nPSW/nSbW)
        j=k/(nPSW/nSbW)
      - The following applies to X ranging from 0 to 1.
        spMvLX[i][j]=spMvLX[xBlk][yBlk]
        spRefIdxLX[i][j]=spRefIdxLX[xBlk][yBlk]
        spPredFlagLX[i][j]=spPredFlagLX[xBlk][yBlk]
  2. Variable lastAvailableFlag is replaced with 1.
  3. xBlk and yBlk are stored in variables xLastAvail and yLastAvail, respectively.
- If curAvailableFlag is 0, and lastAvailableFlag is 1, the following applies to X ranging from 0 to 1.
  spMvLX[xBlk][yBlk]=spMvLX[xLastAvail][yLastAvail]
  spRefIdxLX[xBlk][yBlk]=spRefIdxLX[xLastAvail][yLastAvail]
  spPredFlagLX[xBlk][yBlk]=
  spPredFlagLX[xLastAvail][yLastAvail]
- Variable curSubBlockIdx is set to curSubBlockIdx+1.

Table 1 is now described in detail.

Referring to Table 1, the position of the left and upper end of the current prediction block, the width and height of the current prediction block, a reference view index, and a disparity vector are input to the inter prediction module. In this case, the position of the left and upper end of the current prediction block may be denoted (xPb, yPb), where 'xPb' may refer to the X-axis coordinate of the current prediction block, and 'yPb' the y-axis coordinate of the current prediction block. The width of the current prediction block may be denoted 'nPbW,' and the height of the current prediction block 'nPbH.' The reference view index may be denoted 'refViewIdx,' and the disparity vector 'mvDisp.' In this case, the inter prediction module may correspond to the above-described inter prediction module of the image encoder/decoder.

Referring to FIG. 17, after finishing the process of deriving the motion information on the sub prediction unit of the current block using the sub prediction unit of the reference block, the inter prediction module outputs a flag for determining whether a temporal inter-view motion candidate is available, a temporal inter-view motion vector candidate, and a reference picture present in a reference picture list. In this case, the flag for determining whether a temporal inter-view motion candidate is available may be defined as 'availableFlagLXInterView,' and the temporal inter-view motion candidate may be defined as 'mvLXInterView.' The reference picture list may be denoted 'RefPicListLX,' and the reference index designating a reference picture present in the reference picture list may be defined as 'refIdxLXInterView.' In 'availableFlagLXInterView', 'mvLXInterView', 'RefPicListLX", and 'refIdxLXInterView,' 'LX' may be reference picture list 0(List 0, L0) or reference picture list 1(List 1, L1).

Now described is a method of deriving motion information on a sub prediction unit of a current block using a sub prediction unit of a reference block in order for an inter prediction module to derive the above-described outputs from the above-described inputs.

The inter prediction module performs initialization before deriving motion information on a sub prediction unit of a current block using a sub prediction unit of a reference block. In this case, availableFlagLXInterView is set to 0, mvLXInterView (0,0), and refIdxLXInterView −1. When the inter prediction module performs initialization, the width and height of the sub prediction unit are initialized also. In this case, the width of the sub prediction unit may be denoted 'nSbW,' and the height of the sub prediction unit 'nSbH.' A specific method of initializing variables nSbW and nSbH is given as Equation 1 below.

$$nSbW = \text{Min}(nPbW, \text{SubPbSize}[nuh\_layer\_id])$$

$$nSbH = \text{Min}(nPbH, \text{SubPbSize}[nuh\_layer\_id]) \quad \text{[Equation 1]}$$

In this case, SubPbSize denotes the size (including the height and width) of the sub prediction unit designated by an image parameter set (VPS), and nuh_layer_id denotes an index for identifying a layer (e.g., which reference view it is). Min( ) may be defined as in Equation 2 to output the smaller of input variables.

$$\text{Min}(x, y) = \begin{cases} x; x \leq y \\ y; x > y \end{cases} \quad \text{[Equation 2]}$$

The inter prediction module may initialize not only the above-described variables but also information for identifying a sub prediction unit of the current block and the luma prediction block at (xRef, yRef) in the inter-view reference picture and information for identifying whether the motion information stored in the storage space is available.

In this case, the luma prediction block at (xRef, yRef) in the inter-view reference picture is set as a block in a picture having the same view index as the reference view index in the current access unit. In this case, the luma prediction block at (xRef, yRef) in the inter-view reference picture is defined as 'ivRefPic,' and the access unit means a unit in which an image is encoded/decoded. The access unit includes images with different views, which have the same picture order count (POC). For example, if there are three views, one access unit may include a common image and/or depth information image of the first view, a common image and/or depth information image of the second view, and a common image and/or depth information image of the third view. The reference view index may be defined as 'refViewIdx,' and the view index 'ViewIdx.' In this case, ViewIdx may mean a view of the current picture.

In this case, the information for identifying a sub prediction unit of the current block for initialization may be set to 0, and the information for identifying the sub prediction unit of the current block may be defined as 'curSubBlockIdx.' The information for identifying whether the motion information stored in the storage space is available is also set and initialized to 0, and the information for identifying whether the motion information stored in the storage space may be defined as 'lastAvailableFlag.'

After initializing the above-described variables, the inter prediction module performs the following process on yBlk that ranges from 0 to (nPbH/nSbH-1) and xBlk that ranges from 0 to (nPbW/nSbW-1). Here, xBlk means the x coordinate of the block, and yBlk means the y coordinate of the block.

First, the inter prediction module initializes the information for identifying whether to predict motion information from a sub prediction unit of the reference block, the sub prediction unit prediction flag, motion information on the sub prediction unit, and reference index of the sub prediction unit. Specifically, the information for identifying whether to predict the motion information from the sub prediction unit of the reference block may be set to 0. In this case, the information for identifying whether to predict motion information from the sub prediction unit of the reference block may be defined as 'curAvailableFlag.' The sub prediction unit prediction flag may be set to 0, and the sub prediction unit prediction flag may be defined as 'spPredFlagL1.' To represent coordinates of the block, the sub prediction unit flag may be defined as 'spPredFlagL1 [xBlk][yBlk].' The motion vector of the sub prediction unit is set to (0, 0), and the motion vector of the sub prediction unit may be defined as 'spMvLX.' The reference index of the sub prediction unit may be set to -1, and the reference index of the sub prediction unit may be defined as 'spRefIdxLX.' To represent coordinates of the block, the reference index of the sub prediction unit may be defined as 'spRefIdxLX[xBlk][yBlk]'.

The position (xRef, yRef) of the reference block may be set as in the following Equation 3.

$$xRef = \text{Clip3}(0, \text{PicWidthInSamples}L-1, xPb + xBlk*nSbW + nSbW/2 + ((mvDisp[0]+2)>>2)))$$

$$yRef = \text{Clip3}(0, \text{PicHeightInSamples}L-1, yPb + yBlk*nSbH + nSbH/2 + ((mvDisp[0]+2)>>2))) \quad \text{[Equation 3]}$$

Here, xRef means the x coordinate of the position of the reference block, and yRef means the y coordinate of the position of the reference block. PicWidthInSamplesL means the width at the current picture, and PicHeightInSamplesL means the height at the current picture. Clip3( ) may be defined as in the following Equation 4.

$$\text{Clip3}(x, y, z) = \begin{cases} x; z < x \\ y; x > y \\ z; \text{otherwise} \end{cases} \quad \text{[Equation 4]}$$

In case the inter-view reference block is encoded in intra mode, the following process is performed on X that ranges from 0 to 1. The inter-view reference block refers to a luma prediction block at (xRef, yRef) in the inter-view reference picture indicated by ivRefPic, and the inter-view reference block may be defined as 'ivRefPb.' That is, ivRefPb denotes the luma prediction block at (xRef, yRef) in the inter-view reference picture indicated by ivRefPic, and ivRefPic denotes the inter-view reference picture. The position of the left and upper end of the reference block indicated by ivRefPb may be set to (xIvRefPb, yIvRefPb).

When X is 0 or the current slice is slice B, each variable is reset for Y (Y ranges from X to (1-X)) as follows. refPicListLYIvRef is set to RefPicListLY in the picture indicated by ivRefPic, where RefPicListLY means a reference picture list. predFlagLYIvRef[x][y] is set to PredFlagLY[x][y] in the picture indicated by ivRefPic, where PredFlagLY means an identifier indicating a reference picture list. mvLYIvRef[x][y] is set to MvLY[x][y] in the picture indicated by ivRefPic, where MvLY means a motion vector. Likewise, refIdxLYIvRef[x][y] is set to RefIdxLY[x][y] in the picture indicated by ivRefPic, where RefIdxLY means a reference index.

In this case, if predFlagLYIvRef[xIvRefPb][yIvRefPb] is 1, the following Equation 5 may apply to i ranging from 0 to num_ref_idx_1X_active_minus1(the number of reference pictures in the reference picture list).

$$spMvLX[xBlk][yBlk] = mvLYIvRef[xIvRefPb][yIvRefPb]$$

$$spRefIdxLX[xBlk][yBlk] = i$$

$$spPredFlagLX[xBlk][yBlk] = 1$$

$$curAvailableFlag = 1 \quad \text{[Equation 5]}$$

Meanwhile, referring to Table 1, the following processes respectively apply to the case where curAvailableFlag is 1 and the case where curAvailableFalg is 0.

If curAvailableFlag is 1, the inter prediction module performs the following process.

1. If lastAvailableFlag is 0, the following Equation 6 may apply to X ranging from 0 to 1.

$$mxLX\text{InterView}=sp\text{Mv}LX[x\text{Blk}][y\text{Blk}]$$

$$\text{refIdx}LX\text{InterView}=sp\text{RefIdx}LX[x\text{Blk}][y\text{Blk}]$$

$$\text{availableFlaq}LX\text{Interview}=sp\text{PredFlag}[x\text{Blk}][y\text{Blk}] \quad \text{[Equation 6]}$$

If lastAvailableFlag is 0, and curSubBlockIdx is larger than 0, the following Equation 7 may apply to variables i and j for k ranging from 0 to (curSubBlockIdx−1).

$$i=k\ \%(nPSW/nSbW)$$

$$i=k/(nPSW/nSbW) \quad \text{[Equation 7]}$$

In this case, the following Equation 8 applies to X ranging from 0 to I.

$$sp\text{Mv}LX[i][j]=sp\text{Mv}LX[x\text{Blk}][y\text{Blk}]$$

$$sp\text{RefIdx}LX[i][j]=sp\text{RefIdx}LX[x\text{Blk}][y\text{Blk}]$$

$$sp\text{PredFlag}LX[i][j]=sp\text{PredFlag}LX[x\text{Blk}][y\text{Blk}]$$

2. After the above-described process, the inter prediction module replaces lastAvailableFlag with 1.

3. Thereafter, the inter prediction module stores xBlk and yBlk in variables xLastAvail and yLastAvail, respectively.

If curAvailableFlag is 1, and lastAvailableFlag is 1. the inter prediction module applies the following Equation 9 to X ranging from 0 to 1.

$$sp\text{Mv}LX[x\text{Blk}][y\text{Blk}]=sp\text{Mv}LX[x\text{LastAvail}][y\text{LastAvail}]$$

$$sp\text{RefIdx}LX[x\text{Blk}][y\text{Blk}]=sp\text{RefIdx}LX[x\text{LastAvail}][y\text{LastAvail}]$$

$$sp\text{PredFlag}LX[x\text{Blk}][y\text{Blk}]=sp\text{PredFlag}LX[x\text{LastAvail}][y\text{LastAvail}] \quad \text{[Equation 9]}$$

After performing all of the above-described processes, variable curSubBlockIdx is set to curSubBlockIdx+1.

The method of deriving motion information on a sub prediction unit of a current block described above in connection with FIG. 17, when unable to derive motion information from a sub prediction unit of a reference block, uses the motion information on a sub prediction unit of the reference block, which has been referenced before (or afterwards). As such, the method of deriving motion information according to FIG. 17 should necessarily reference a sub prediction unit of other reference block and thus this method is dependent. A dependent motion information deriving method is vulnerable to parallel designs, which is described in detail with reference to FIG. 18.

Figure 18:
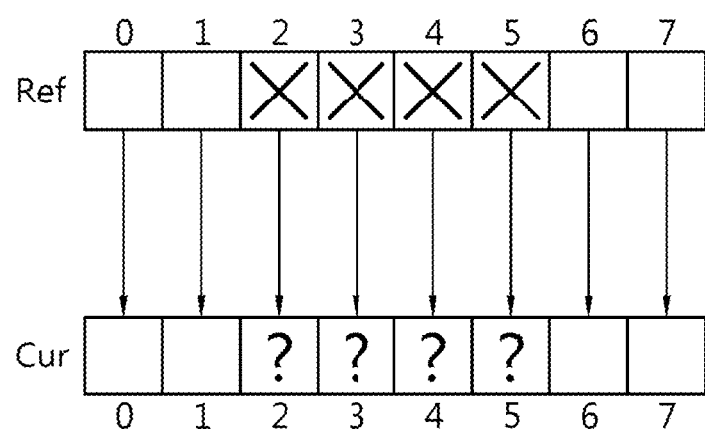
FIG. 18 is a view illustrating an exemplary process of deriving in parallel information on a sub prediction unit of a current block using a sub prediction unit of a reference block.

FIG. 18 is a view illustrating an exemplary process of deriving in parallel information on a sub prediction unit of a current block using a sub prediction unit of a reference block.

Referring to FIG. 18, Ref means a reference block, and Refs 0, 1, 2, 3, 4, 5, 6, and 7 are sub prediction units 0, 1, 2, 3, 4, 5, 6, and 7, respectively, of the reference block. Cur means a current block, and Curs 0, 1, 2, 3, 4, 5, 6, and 7 mean sub prediction units 0, 1, 2, 3, 4, 5, 6, and 7, respectively, of the current block. X marked in Refs 2, 3, 4, and 5 mean that sub prediction units 2, 3, 4, and 5 of the reference block are unavailable upon deriving motion information.

In an embodiment according to FIG. 18, the inter prediction module detects a sub prediction unit from which motion information may be derived as described above, in order to derive motion information from a sub prediction unit from which motion information cannot be derived. Accordingly, the inter prediction module cannot independently derive motion information for each sub prediction unit of the current block, and the above-described motion information deriving process is difficult to perform in parallel.

Figure 19:
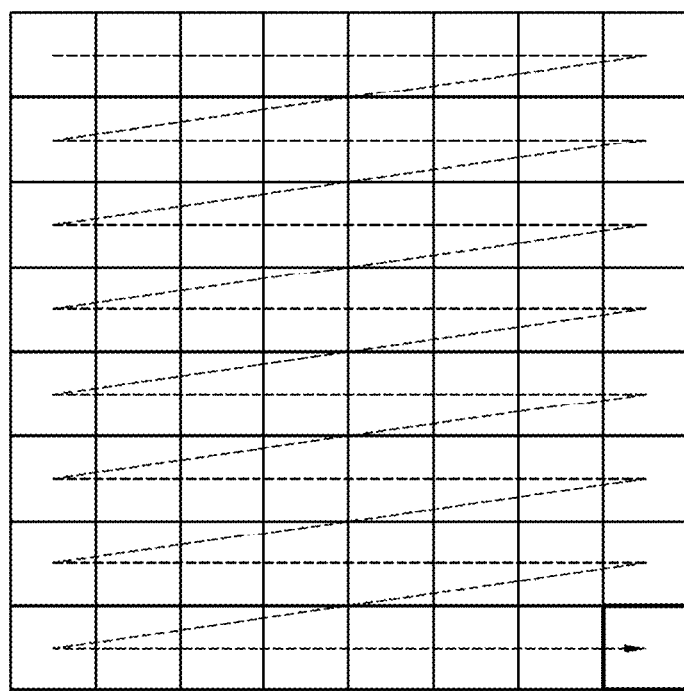
FIG. 19 is a view illustrating an exemplary process of discovering an available sub prediction unit when the available sub prediction unit is positioned at the rightmost and lowermost end of a reference block.

FIG. 19 is a view illustrating an exemplary process of discovering an available sub prediction unit when the available sub prediction unit is positioned at the rightmost and lowermost end of a reference block.

Referring to FIG. 19, each square means a sub prediction unit, where the bold solid lined one means an available sub prediction unit upon deriving motion information while the thinner sold lined ones mean unavailable sub prediction units upon deriving motion information. The dash-line arrow indicates an order of discovering motion information.

In case a sub prediction unit from which motion information may be derived is positioned only at the rightmost and lowermost end of the reference block as shown in FIG. 19, the sub prediction units should be sequentially subject to discovery of a sub prediction unit from which motion information may be derived along the dash-line arrow from the leftmost and uppermost end of the reference block. In a typical case, it is not known which sub prediction unit in what reference block may be put to use for deriving motion information. Accordingly, the sub prediction units of the reference block are subject to sequential discovery from the first sub prediction unit of the reference block to determine a sub prediction unit that may be used for deriving motion information.

However, the approach of deriving motion information as shown in FIG. 19 requires all of the sub prediction units in the reference block to discover an available sub prediction unit, thus causing frequent access to the memory. In this case, if only a few among the sub prediction units of the reference block have motion information, unnecessary sub prediction unit discovery occurs. In particular, if none of the sub prediction units in the reference block are used to derive motion information, the process of discovering available sub prediction units of the reference block only brings about unnecessary memory access without any benefit. In this case, "having no motion information" means that the current block failed to discover a similar region in the reference block of a neighboring frame.

Accordingly, in case only a few or none of the sub prediction units in a reference block have motion information, encoding/decoding the current block using inter prediction may lead to more efficiency. In other words, in such case that only a few or none of the sub prediction units in a reference block have motion information, it may be more efficient to discover a similar region in a neighboring pixel of the current block to perform encoding/decoding on the current block.

Figure 20:
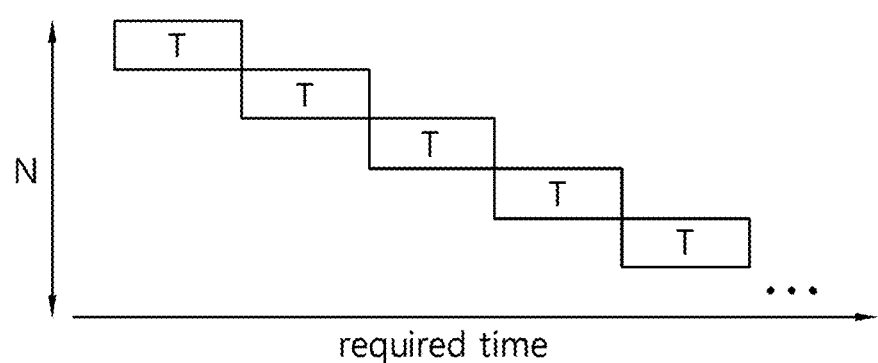
FIG. 20 is a view schematically illustrating times required to derive motion information on a per-sub prediction unit basis.

FIG. 20 is a view schematically illustrating times required to derive motion information on a per-sub prediction unit basis.

Referring to FIG. 20, when the time taken to derive motion information from one sub prediction unit is T, and the number of sub prediction units in a reference block is N, the time taken to derive all the motion information from the reference block is N×T. The above-mentioned motion information deriving method brings about data dependency and frequent memory access. Data-dependent motion information deriving methods cannot independently derive motion information from each sub prediction unit, and in order to derive motion information from one sub prediction unit, it should thus wait until motion information is derived from other sub prediction unit. Therefore, the data-dependent motion information deriving methods may cause an encoding/decoding delay.

Resultantly, the above-described motion information deriving method cannot achieve data parallelization for simultaneously deriving motion information, and from its design architecture, the method may cause frequent memory access which deteriorates memory use efficiency.

Figure 21:
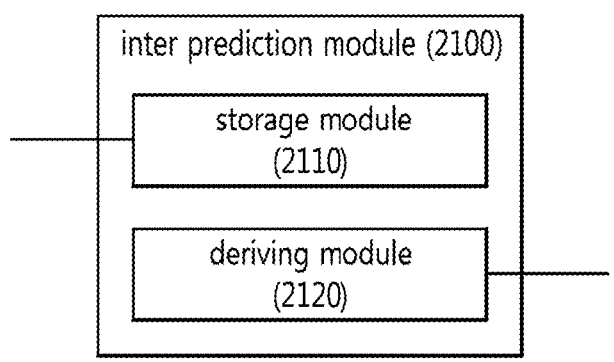
FIG. 21 is a block diagram illustrating a configuration of an inter prediction module to which the present invention applies.

An apparatus and method for removing dependency when deriving motion information is proposed herein to address the above issues. FIG. 21 illustrates an exemplary configuration of an inter prediction module to which the present invention applies. A method of deriving motion information is described in detail with reference to FIGS. 22 to 26, according to an embodiment of the present invention.

FIG. 21 is a block diagram illustrating a configuration of an inter prediction module 2100 to which the present invention applies.

Referring to FIG. 21, the inter prediction module 2100 may include a storage module 2110 and a deriving module 2120. The inter prediction module 2100 may mean the above-described inter prediction module 710 in the 3D image encoder or the inter prediction module 850 in the 3D image decoder. The inter prediction module 2100 of FIG. 21 may apply to the above-described image encoding/decoding process.

The storage module 2110 designates a motion information and stores the same in a storage space. The storage module 2110 may use motion information present at a position of the reference block in order to obtain the motion information stored. Here, the position may be the center of the reference block or a (sub) prediction unit covering the center of the reference block. The motion information stored in the storage module 2110 may be set to an initial value. Unless the motion information can be stored in the storage space, the process of deriving motion information on a per-sub prediction unit basis may be omitted. When omitting the process of deriving motion information on a per-sub prediction unit basis, inter prediction may be carried out as described supra. The storage module 2110 is described below in greater detail.

The deriving module 2120 performs a process of deriving motion information from a sub prediction unit of the current block. In this case, the deriving module 2120 may basically perform the above-described motion information deriving process. However, the deriving module 2120 proposed herein, unless the sub prediction unit of the reference block corresponding to the first sub prediction unit of the current block has motion information, may perform discovery to the sub prediction unit of the reference block having motion information, and instead of deriving motion information on the first sub prediction unit of the current block from the sub prediction unit of the reference block having motion information, may then derive motion information on the first sub prediction unit of the current block from the motion information stored in the storage module. The deriving module 2120 is described below in greater detail.

Embodiments of the present invention are now described in detail with reference to the drawings.

Embodiment 1

Figure 22:
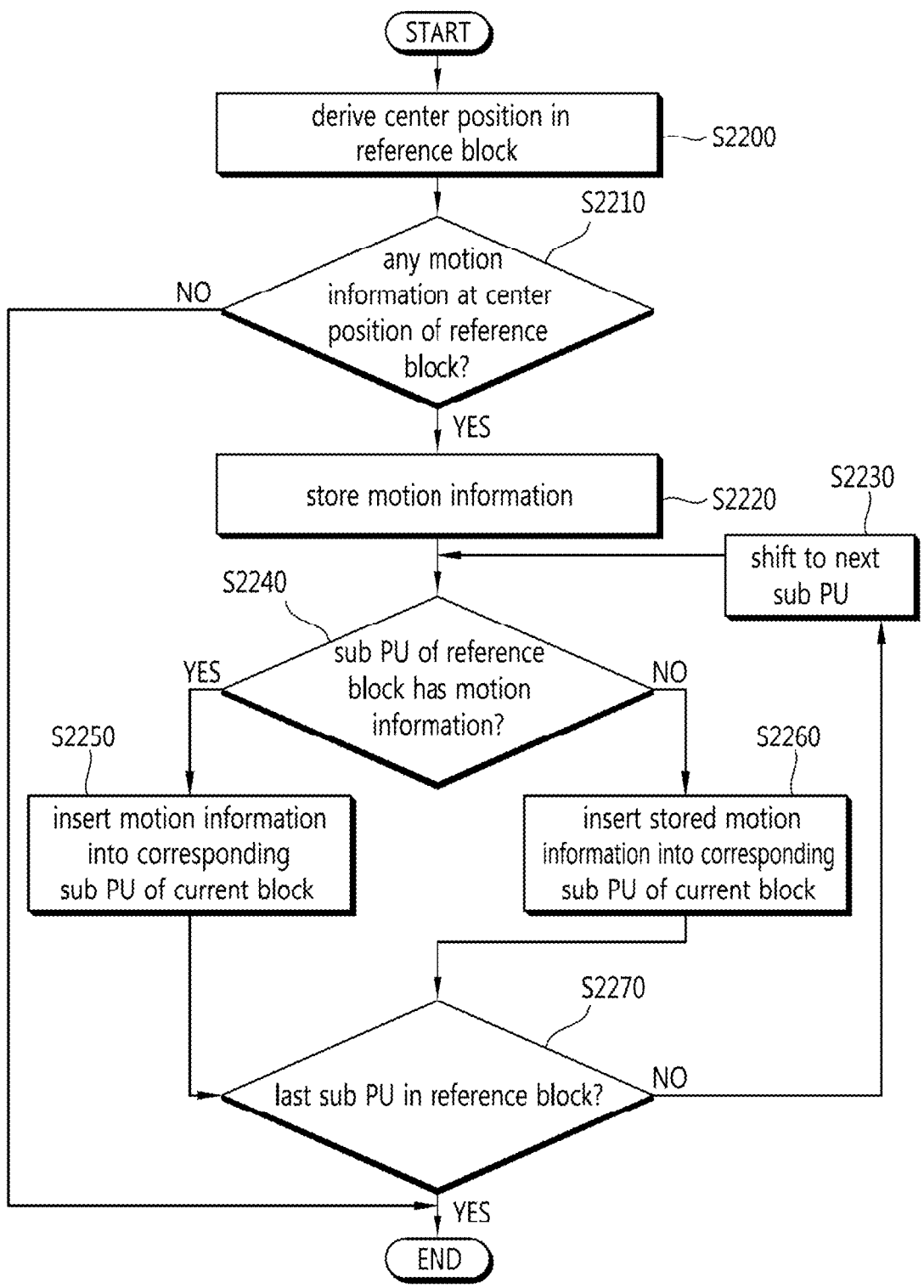
FIG. 22 is a flowchart schematically illustrating a method of deriving motion information on a sub prediction unit of a current block using a reference block, according to an embodiment of the present invention.

FIG. 22 is a flowchart schematically illustrating a method of deriving motion information on a sub prediction unit of a current block using a reference block, according to an embodiment of the present invention.

In embodiment 1, motion information on a sub prediction unit of a current block (current sub unit) is derived based on motion information for the center position of a reference block. Embodiment 1 may be performed in an encoder and decoder or a predicting unit or inter prediction module of the encoder and decoder. For ease of description herein, the inter prediction module 2100 of FIG. 21 performs the operation of embodiment 1.

Referring to FIG. 22, the inter prediction module 2100 may derive the center position of the reference block (S2200). The center position of the reference block may be derived from Equation 10 below. Here, the reference block may be a block present at the same position as the current block in the reference picture, and the reference block may have the same size as the current block.

$$X \text{ position} = xPb + (nPbW \gg 1)$$

$$Y \text{ position} = yPb + (nPbH \gg 1) \quad \text{[Equation 10]}$$

Here, xPb and yPb refer to a left and upper position of the current PU, nPbW the width of the current PU, and nPbH the height of the current PU.

The inter prediction module 2100 may determine whether there is motion information at the center position of the reference block (S2210). The center position of the reference block may be specified as described above.

Unless there is motion information available at the center position of the reference block, the inter prediction module 2100 may terminate the process of deriving motion information. For example, without available motion information at the center of the reference block, the inter prediction module 2100 might not derive motion information on the current block.

If motion information is present at the center position of the reference block, the inter prediction module 2100 may store the motion information present at the center position of the reference block in the storage space (S2220). The motion information present at the center position of the reference block may be motion information on the prediction block including a full sample position most adjacent to the center of the reference block. A specific process of storing motion information by the inter prediction module 2100 has been described above. The inter prediction module 2100 may derive motion information on a current sub prediction unit based on the stored motion information on the reference block.

The inter prediction module 2100 may determine whether the sub prediction unit of the reference block corresponding to the current sub prediction unit has motion information (S2240).

In case the sub prediction unit of the reference block has motion information, the inter prediction module 2100 may insert into the current sub prediction unit the motion information on the sub prediction unit of the reference block (S2250). In other words, the inter prediction module 2100 may set the motion information on the sub prediction unit of the reference block (for example, motion vector, reference picture index) as the motion information on the corresponding current sub prediction unit.

Unless the sub prediction unit of the reference block has available motion information, the inter prediction module 2100 inserts into the current sub prediction unit the motion information of the reference block stored in the storage space (S2260). In other words, in case the motion information on the sub prediction unit of the reference block corresponding to the current sub prediction unit is unavailable, the inter prediction module 2100 may set the motion information on the center of the reference block stored in step S2200 as the motion information on the current sub prediction unit.

The inter prediction module 2100 may determine whether the sub prediction unit of the reference block corresponding to the current sub prediction unit is the last sub prediction unit in the reference block (or in the same meaning whether the current sub prediction unit is the last sub prediction unit in the current block) (S2270). The inter prediction module 2100 may terminate the process of deriving motion information in case the sub prediction unit of the reference block is the last sub prediction unit.

Unless the sub prediction unit of the reference block is the last sub prediction unit, the inter prediction module 2100 goes on with driving motion information on a next sub prediction unit of the current block in order to continue to derive motion information (S2230).

The above-described motion information deriving process according to embodiment 1 may apply to 3D image decoding as in Table 2.

TABLE 2

This process has the following inputs.
- Position (xPb, yPb) of left and upper end of current prediction unit
- Width (nPbW) and height of current prediction unit
- Reference view index refViewIdx
- Disparity vector mvDisp
This process has the following outputs.
- Flag availableFlagLXinterView for determining whether temporal inter-view motion candidate is available, where LX may be reference picture list L0 and L1.
- Temporal inter-view motion vector candidate mvLXInterView, where LX may be reference picture lists L0 and L1.
- Reference index refIdxLXInterView designating a reference picture present in reference picture list RefPicListLX, where LX may be reference picture lists L0 and L1.
LX may be reference picture lists L0 and L1. The following applies to LX.
- Flag availableFlagLXInterView is initialized as 0.
- Motion vector mvLXInterView is initialized as (0,0).
- Reference index refIdxLXInterView is initialized as −1.
Variables nSbW and nSbH are initialized as follows.
Variables nSbW and nSbH are initialized as follows.
nSbW=Min(nPbW, SubPbSize)
nSbH=Min(nPbH, SubPbSize)
where, SubPbSize is the size including height and width of the sub prediction unit designated by VPS.
Variable ivRefPic is initialized as a picture having the same ViewIdx as refViewIdx in the current access unit.
Variable curSubBlockIdx is initialized as 0.
Reference position (xRef, yRef) may be derived as follows.
    xRefFull = xPb + ( nPbW >> 1 ) + ( ( mvDisp[ 0 ] + 2 ) >> 2 )
    yRefFull = yPb + ( nPbH >> 1 ) + ( ( mvDisp[ 1 ] + 2 ) >> 2 )
    xRef = Clip3( 0, PicWidthInSamplesL − 1. ( xRefFull >> 3 ) << 3 )
    yRef = Clip3( 0, PicHeightSamplesL − 1. ( yRefFull >> 3 ) << 3 )
ivRefPic is set to the picture having the same ViewIdx as refViewIdx in the current access unit. The motion information in the reference picture may be stored in units of 8×8 pixel blocks. Correction factors xRefFull and yRefFull may be the position of the center full sample of the reference block specified using mvDisp.
ivRefPb may be a prediction block covering position (xRef, yRef) in ivRefPic.
(xIvRefPb, yIvRefPb) specifies the left and upper position of ivRefPb.
Unless ivRefPb has been encoded in intra mode, the following may apply to Y ranging from X to (1−X).
  - refPixListLYIvRef, predFlagLYIvRef[x][y], mvLYIvRef[x][y], and refIdxLYIvRef[x][y], respectively, are set to their respective corresponding variables, i.e., RefPicListLY, PredFlagLY[x][y], MvLY[x][y], and RefIdxLY[x][y] in the inter-view reference picture ivRefPic.
  - If predFlagLYIvRef[xIvRefPb][yIvRefPb] is 1, the following may apply to i ranging from 0 to num_ref_idx_1X_active_minus1 (the number of reference pictures in reference picture list).
    - If POC (Picture Order Count) of refPicListLYIvRef[refIdxLYIvRef[xIvRefPb][yIvRefPb]] is the same as RefPicListLX[i] and availableFlagLXInterView is 0, the following applies.
      availableFlagLXInterView = 1
      mvLXInterView = mvLYIvRef[ xIvRefPb ][ yIvRefPb ]
      refIdxLX = i
If availableFlagL0InterView or availableFlagL1Interview is 1, the following is performed.
- The following applies to yBlk ranging from 0 to (nPbH/nSbH−1) and xBlk ranging from 0 to (nPbW/nSbW−1).
- Variable curAvailableFlag is initialized as 0.
- The following applies to X ranging from 0 to 1.
- Flag spPredFlagL1[xBlk][yBlk] is initialized as 0.
- Motion vector spMvLX is initialized as (0,0).
- Reference index spRefIdxLX[xBlk][yBlk] is initialized as −1.
- Reference block position (xRef, yRef) is derived as follows.
xRef=Clip 3(0, PicWidthInSamplesL−1),
xPb+xBlk*nSbW+nSbW/2+((mvDisp[0]+2)>>2))
yRef=Clip3(0, PicHeightInSamplesL−1),
yPb+yBlk*nSbH+nSbH/2+((mvDisp[1]+2)>>2))

TABLE 2-continued

- Variable ivRefPb refers to luma prediction block at (xRef, yRef) in the inter-view reference picture indicated by ivRefPic.
- (xIvRefPb, yIvRefPb) refers to the left and upper position of the reference block indicated by ivRefPb.
- Unless ivRefPb has been encoded in intra mode, the following is performed on X ranging from 0 to 1.
- When X is 0 or current slice is slice B, the following is performed on Y ranging from X to (1−X).
- refPixListLYIvRef, predFlagLYIvRef[x][y], mvLYIvRef[x][y], and refIdxLYIvRef[x][y], respectively, are set to RefPicListLY, PredFlagLY[x][y], MvLY[x][y], and RefIdxLY[x][y] in the picture indicated by ivRefPic.
- If predFlagLYIvRef[xIvRefPb][yIvRefPb] is 1, the following is performed on i ranging from 0 to num_ref_idx_1X_active_minus1 (the number of reference pictures in reference picture list).
- If POC of refPicListLYIvRef[refIdxLYIvRef[xIvRefPb][yIvRefPb]] is the same as RefPicListLX[i] and spPredFlagLX[xBlk][yBlk] is 0, the following applies.
spMvLX[xBlk][yBlk]=mvLYIvRef[xIvRefPb][yIvRefPb]
spRefIdxLX[xBlk][yBlk]=i
spPredLfagLX[xBlk][yBlk]=1
curAvailablePlag=1
- The following applies according to curAvailableFlag.
- If curAvailableFlag is 0, the following applies to X ranging from 0 to 1.
   spMvLX[ xBlk ][ yBlk ] = mvLXInterView
   spRefIdxLX[ xBlk ][ yBlk ] = refIdxLX
   spPredFlagLX[ xBLk ][ yBlk ] = availableFlagLXInterView
- Variable curSubBlockIdx is set to curSubBlockIdx+1.
If availableFlagL0InterView and availableFlagL1InterView are 0, the process is terminated.

Embodiment 1 is described again based on Table 2.

Referring to Table 2, the position of the left and upper end of the current prediction block, the width and height of the current prediction block, a reference view index, and a disparity vector are input to the inter prediction module 2100. Here, the position of the left and upper end of the current prediction block may be defined as (xPb, yPb). The width of the current prediction block may be defined as 'nPbW,' and the height of the current prediction block 'nPbH.' The reference view index may be defined as 'refViewIdx,' and the disparity vector 'mvDisp.'

After finishing the process of deriving motion information on the sub prediction unit of the current block using the sub prediction unit of the reference block, the inter prediction module 2100 may output a flag for determining whether inter-view prediction is possible, an inter-view motion vector, and a reference index designating a reference picture present in a reference picture list. In this case, the flag for determining whether a temporal inter-view motion candidate is available may be defined as 'availableFlagLXInterView,' and the temporal inter-view motion candidate may be defined as 'mvLXInterView.' The reference picture list may be denoted 'RefPicListLX,' and the reference index designating a reference picture present in the reference picture list may be defined as 'refIdxLXInterView.' In 'availableFlagLXInterView', 'mvLXInterView', 'RefPicListLX'', and 'refIdxLXInterView,' 'LX' may be reference picture list 0(List 0, L0) or reference picture list 1(List 1, L1).

Now described is a method of deriving motion information on a sub prediction unit of a current block by obtaining the above-described outputs from the inputs.

First, the inter prediction module 2100 performs initialization before deriving motion information on a sub prediction unit of a current block using a sub prediction unit of a reference block. In this case, availableFlagLXInterView may be set to 0, mvLXInterView (0,0), and refIdxLXInterView −1. When the inter prediction module 2100 performs initialization, the width and height of the sub prediction unit may be initialized also. In this case, the width of the sub prediction unit may be denoted 'nSbW,' and the height of the sub prediction unit 'nSbH.' Equation 11 represents an example of a method for initializing variables nSbW and nSbH.

$nSbW = \text{Min}(nPbW, \text{SubPbSize}[nuh\_layer\_id])$ $nSbH = \text{Min}(nPbH, \text{SubPbSize}[nuh\_layer\_id])$    [Equation 1]

In this case, SubPbSize denotes the size (including the height and width) of the sub prediction unit designated by a VPS, and nuh_layer_id denotes an index for identifying a layer (e.g., which reference view it is). Min( ) is an operator outputting the smaller of variables input.

The inter prediction module 2100 may initialize not only the above-described variables but also information for identifying a sub prediction unit of the current block and the luma prediction block at (xRef, yRef) in the inter-view reference picture and information for identifying whether the motion information stored in the storage space is available.

In this case, the inter-view reference picture may be set to a picture having a view index such as a reference view index in the current access unit. Here, the inter-view reference picture may be denoted 'ivRefPic,' and the luma prediction block at (xRef, yRef) in the inter-view reference picture may be denoted 'ivRefPb.' One access unit includes images with different views, which have the same picture order count (POC). The reference view index may be defined as 'refViewIdx,' and the view index 'ViewIdx.'

The reference position may be a position specifying a prediction block covering the center of the reference block according to embodiment 1. The motion information on the reference position may be stored in order to derive motion information on the current sub prediction unit. Equation 12 shows an exemplary method of deriving the reference position (xRef, yRef).

$xRefFull = xPb + (nPbW >> 1) + ((mvDisp[0] + 2) >> 2)$ $yRefFull = yPb + (nPbH >> 1) + ((mvDisp[1] + 2) >> 2)$ $xRef = \text{Clip3}(0, \text{PicWidthInSamples}_L - 1, (xRefFull >> 3) << 3)$ $yRef = \text{Clip3}(0, \text{PicHeightInSamples}_L - 1, (yRefFull >> 3) << 3)$    [Equation 12]

Here, XRefFull and yRefFull denote the position of the full sample close to the center of the reference block. That is, xRefFull and yRefFull respectively denote the x coordinate and the y coordinate of the sample at an integer position.

ivRefPb may be a sub prediction unit or prediction block covering (xRef, yRef). The position (xIvRefPb, yIvRefPb) of the luma sample may specify the left and upper end of ivRefPb.

Unless ivRefPb has been encoded/decoded in intra mode, the following processes (1) and (2) may apply to Y ranging from X to (1-X).

refPicListLYIvRef is set to RefPicListLY in the inter-view reference picture ivRefPic, predFlagLYIvRef[x][y] to Pred-Flag[x][y] in the inter-view reference picture ivRefPic, and refIdxLYIvRef[x][y] to RefIdxLY[x][y] in the inter-view reference picture ivRefPic.

if predFlagLYIvRef[xIvRefPb][yIvRefPb] is 1, the following process applies to i ranging from 0 to num_ref_idx_lX_active_minus1(the number of reference pictures in the reference picture list X). If POC (Picture Order Count: of refPicListLYIvRef[refIdxLYIvRef[xIvRefPb][yIvRefPb]] is RefPicListLX[i], and availableFlagLXInterView is 0, Equation 13 may apply.

availableFlag$LX$InterView=1 mv$LX$InterView=mv$LY$IvRef[xIvRefPb][yIvRefPb]

refIdx$LX$=$i$ [Equation 13]

In case availableFlagL0InterView or availableFlagL1InterView is 1, the inter prediction module 2100 performs the following process on yBlk that ranges from 0 to (nPbH/nSbH−1) and xBlk that ranges from 0 to (nPbW/nSbW−1). Here, xBlk means the x coordinate, and yBlk means the y coordinate. In other words, if motion information available at the center of the reference block is derived, the inter prediction module 2100 may derive motion information on a per-sub prediction unit basis.

First, the inter prediction 2100 unit may initialize the information for identifying whether to predict motion information from a sub prediction unit of the reference block, the sub prediction unit prediction flag, motion information on the sub prediction unit, and reference index of the sub prediction unit.

In this case, the information for identifying whether to predict motion information from a sub prediction unit of the reference block may be defined as 'curAvailableFlag.' the sub prediction unit prediction Hag 'spPredFlagLX1,' the sub prediction unit flag 'spPredFlagLX[xBlk][yBlk],' the motion vector of the sub prediction unit 'spMvLX,' the reference index of the sub prediction unit 'spRefIdxLX.' and the reference index of the sub prediction unit 'spRefIdxLX [xBlk][yBlk].'

The position (xRef. yRef) of the reference block is reset on a per-sub prediction unit basis as in the following Equation 14.

xRef=Clip3(0,PicWidthInSamples$L$−1,$x$
    Pb+$x$Blk*$nSbW$+$nSbW$/2+((mvDisp[0]+2)>>2)))

yRef=Clip3(0,PicHeightInSamples$L$−1,$y$
    Pb+$y$Blk*$nSbH$+$nSbH$/2+((mvDisp[0]+2)>>2))) [Equation 14]

PicWidthInSamplesL means the width of the current picture, and PicHeightInSamplesL means the height of the current picture. Further. Clip3( ) has been described above.

Thereafter, in case the inter-view reference block is encoded in intra mode, the following process is performed on X that ranges from 0 to I.

When X is 0 or the current slice is slice B, each variable is reset for Y (Y ranges front X to (1−X)) as follows. refPicListLYIvRef may be set to reference picture list RefPicListLY for a picture specified by ivRefPic (i.e., the inter-view reference picture). predFlagLYIvRef[x][y] is set to PredFlagLY[x][y]. PredFlagLY[x][y] indicates the reference picture list that applies at (x,y) in the picture specified by ivRefPic. mvLYIvRef[x][y] is set to MvLY[x][y]. MvLY[x][y] means the motion vector at (x,y) in the picture specified by ivRefPic. refIdxLYIvRef[x][y] is set to RefIdxLY[x][y]. RefIdxLY[x][y] indicates the reference pixel at (x,y) in the picture indicated by ivRefPic.

In case predFlagLYIvRef[xIvRefPb][yIvRefPb] is 1, the following Equation 15 may apply to i ranging from 0 to num_ref_idx_lX_active_minus1(the number of reference pictures in the reference picture list) if POC of refPicListLYIvRef[refIdxLYIvRef[xIvRefPb][yIvRefPb]] is RefPicListLX[i] and spPredFlagLX[xBlk][yBlk] is 0.

spMv$LX$[xBlk][yBlk]=mv$LY$IvRef[xIvRefPb]
    [yIvRefPb]

spRefIdx$LX$[xBlk][yBlk]=$i$ spPredFlag$LX$[xBlk][yBlk]=1 curAvailableFlag=1 [Equation 15]

Even after the above-described process has been performed, if curAvailableFlag as set is 0 (i.e., unless spRefidxLX=i (e.g., spRefIdxLx=−1). and spPredFlagLX=1 (e.g., spPredFlagLX=−1)), it may be said that no motion information may be derived on a per-sub prediction unit basis. Accordingly, the inter prediction module 2100 may apply Equation 16 to X ranging from 0 to 1.

In other words, in case motion information cannot be derived from the sub prediction unit of the reference block, the inter prediction module 2100 may derive motion information on the sub prediction unit of the current block from the motion information on the center position of the reference block.

spMv$LX$[xBlk][yBlk]=mv$LX$InterView spRefIdx$LX$[xBlk][yBlk]=refIdx$LX$ spPredFlag$LX$[xBlk][yBlk]=availableFlag$LX$InterView [Equation 16]

Finally, after all of the above-described processes have been done, variable, curSubBlockIdx, is set to curSubBlockIdx+1, and if availableFlagL0InterView and availableFlagL1InterView are 0, the process of deriving motion information according to embodiment 1 is ended.

Embodiment 2

Figure 23:
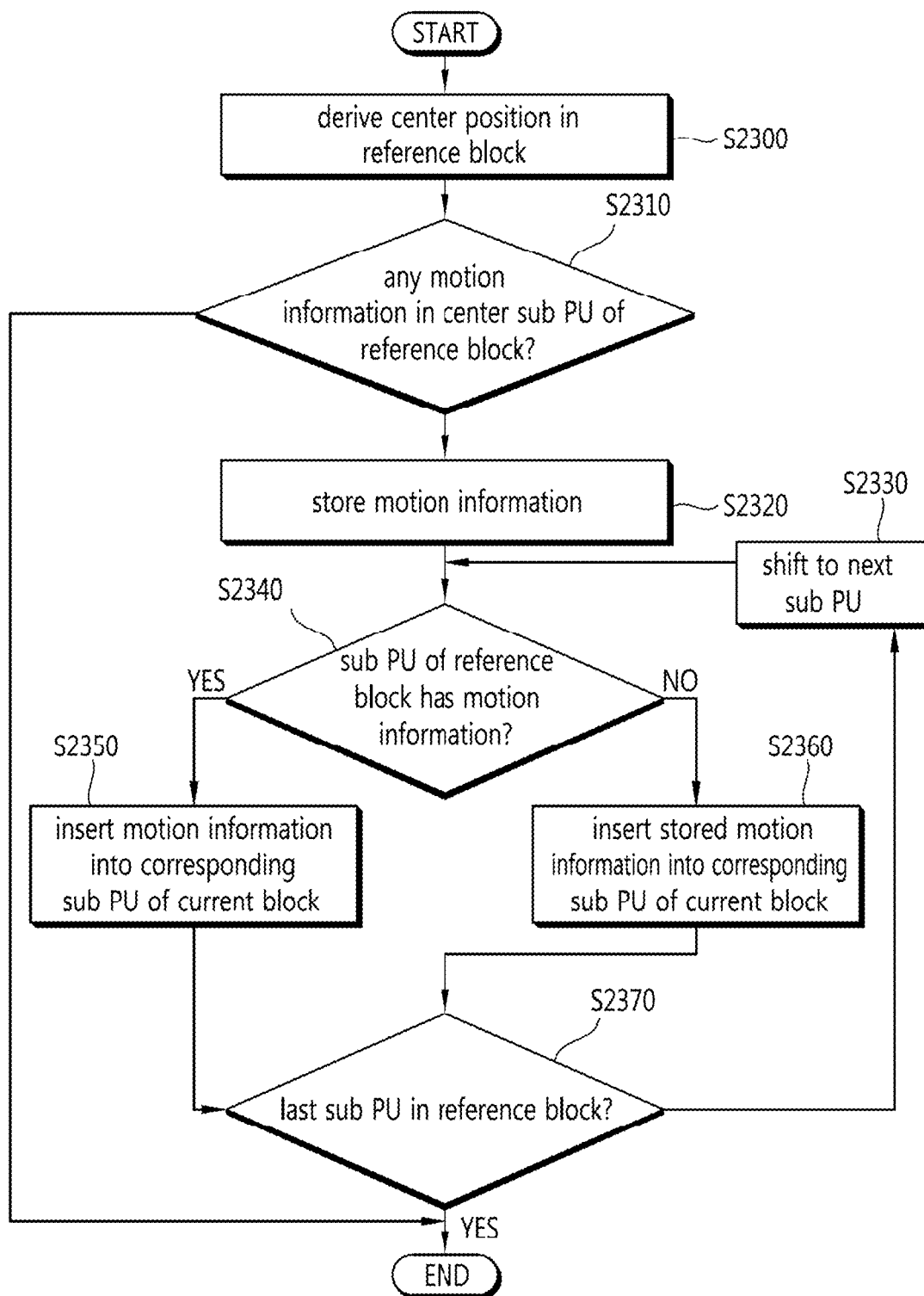
FIG. 23 is a flowchart schematically illustrating a method of deriving motion information on a sub prediction unit of a current block, according to another embodiment of the present invention.

FIG. 23 is a flowchart schematically illustrating a method of deriving motion information on a sub prediction unit of a current block, according to another embodiment of the present invention. In the example illustrated in FIG. 23, motion information on a sub prediction unit of a current block may be derived using a sub prediction unit present at a position of a reference block.

In embodiment 2, the motion information on the sub prediction unit of the current block may be derived based on the motion information on the sub prediction unit covering the center of the reference block.

The example shown in FIG. 23 may be performed in an encoder and decoder or a predicting unit of the encoder and decoder or the inter prediction module 2100 shown in FIG. 21. Here, for ease of description, the inter prediction module 2100 performs each step as shown in FIG. 23.

Referring to FIG. 23, the inter prediction module 2100 may derive the position of the sub prediction unit positioned at the center of the reference block (center sub prediction unit) (S2300). The center sub prediction unit positioned in the reference block means a sub prediction unit located at the center of the reference block, and the center of the reference block has been described above. Equation 17 represents an example of deriving the position of the center sub prediction unit of the reference block.

Center sub prediction unit's $X$ value=$xPb+(nPbW/nSbW/2)*nSbW+nSbW/2$

Center sub prediction unit's $Y$ value=$yPb+(nPbH/nSbH/2)*nSbH+nSbH/2$ [Equation 17]

Here, xPb and yPb refer to a left and upper position of the current prediction unit, nPbW the width of the current prediction unit, and nPbH the height of the current prediction unit.

The inter prediction module 2100 determines whether the center sub prediction unit of the reference block has motion information (S2310), and the position of the center sub prediction unit of the reference block has been described above. If no motion information is present at the position of the center sub prediction unit of the reference block, the inter prediction module 2100 may terminate the motion information deriving process.

In case motion information is present in the center sub prediction unit of the reference block, the inter prediction module 2100 may store the motion information present at the center position (S2320). A specific process of storing motion information by the inter prediction module 2100 has been described above.

The inter prediction module 2100 derives motion information on the current sub prediction unit. The inter prediction module 2100 may determine whether the sub prediction unit of the reference block corresponding to the current sub prediction unit has motion information (S2340).

In case the sub prediction unit of the reference block has motion information, the inter prediction module 2100 may insert into the current sub prediction unit the motion information present in the sub prediction unit of the reference block (S2350). Unless the sub prediction unit of the reference block has motion information, the inter prediction module 2100 may insert the motion information stored in step S2320 into the current sub prediction unit (S2360).

The inter prediction module 2100 may determine whether the sub prediction unit of the reference block which is targeted for deriving motion information is the last sub prediction unit (S2370). In case the sub prediction unit of the reference block is the last sub prediction unit, the inter prediction module 2100 may terminate the process of deriving motion information on the current block. Unless the sub prediction unit of the reference block is the last sub prediction unit, it goes to a next sub prediction unit of the current block to continue to derive motion information (S2330).

The above-described motion information deriving process according to embodiment 2 may apply to 3D images as in Table 3.

TABLE 3

This process has the following inputs.
- Position (xPb, yPb) of left and upper end of the current prediction unit
- Width (nPbW) and height (nPbH) of the current prediction unit
- Reference view index RefViewIdx
- Disparity vector mvDisp
This process has the following outputs.
- Flag availableFlagLXInterView for determining whether temporal inter-view candidate is available, where LX may be reference picture lists L0 and L1.
- Temporal inter-view motion vector candidate mvLXInterView, where LX may be reference picture lists L0 and L1.
- Reference index refIdxLXInterView designating a reference picture present in reference picture list RefPicListLX, where LX may be reference picture lists L0 and L1.
LX may be reference picture lists L0 and L1. The following applies to LX.
- Flag availableFlagLXInterView is initialized as 0.
- Motion vector mvLXInterView is initialized as (0, 0).
- Reference index refIdxLXInterView is initialized as −1.
Variables nSbW and nSbH are initialized as follows.
- nSbW = Min( nPbW, SubPbSize )
- nSbH = Min( nPbH, SubPbSize )
where, SubPbSize is the size including height and width of the sub prediction unit designated by VPS.
Variable ivRefPic is initialized as a picture having the same ViewIdx as refViewIdx in the current access unit.
Variable curSubBlockIdx is initialized as 0.
Reference position (xRef, yRef) may be derived as follows.
xRef = Clip3( 0, PicWidthInSamplesL − 1, xPb + (nPbW / nSbW / 2) * nSbW + nSbW/2)
yRef = Clip3( 0, PicHeightInSamplesL − 1, yPb + (nPbH / nSbH / 2) * nSbH + nSbH/2)
ivRefPic is set to the picture having the same ViewIdx as refViewIdx in the current access unit.
ivRefPb is set to the prediction block covering position (xRef, yRef) in ivRefPic.
(xIvRefPb, yIvRefPb) is set to the left and upper position of the reference block indicated by ivRefPb.
Unless ivRefPb has been encoded in intra mode, the following may apply to X ranging from 0 to 1
- When X is 0 or current slice is slice B, the following applies to Y ranging from X to (1−X).
- refPixListLYIvRef, predFlagLYIvRef[x][y], mvLYIvRef[x][y], and refIdxLYIvRef[x][y], respectively, are set to their respective corresponding variables, i.e. RefPicListLY, TABLE 3-continued PredFlagLY[x][y], MvLY[x][y], and RefIdxLY[x][y] in the inter-view reference picture
ivRefPic.
- If predFlagLYIvRef[xIvRefPb][yIvRefPb] is 1, the following may apply to i ranging from 0
to num_ref_idx_1X_active_minus1 (the number of reference pictures in reference picture list).
- If POC (Picture Order Count) of refPicListLYIvRef[refIdxLYIvRef[xIvRefPb][yIvRefPb]] is
the same as RefPicListLX[i] and centerPredFlag is 0, the following applies.
    centerAvailableFlag = 1
    centerMvLX = mvLYIvRef[ xIvRefPb ][ yIvRefPb ]
    centerRefIdxLX = i
    centerPrdeFlagLX = 1
If centerAvailableFlag is 1, the following is performed.
- The following applies to yBlk ranging from 0 to (nPbH/nSbH−1) and xBlk ranging from 0 to
(nPbW/nSbW−1).
- Variable curAvailableFlag is initialized as 0.
- The following applies to X ranging from 0 to 1.
- Flag spPredFlagL1[xBlk][yBlk] is initialized as 0.
- Motion vector spMvLX is initialized as (0,0).
- Reference index spRefIdxLX[xBlk][yBlk] is initialized as −1.
- Reference block position (xRef, yRef) is derived as follows.
xRef=Clip3(0, PicWidthInSamples L−1),
xPb+xBlk*nSbW+nSbW/2+((mvDisp[0]+2)>>2))
yRef=Clip3(0, PicHeightInSamplesL−1),
yPb+yBlk*nSbH+nSbH/2+((mvDisp[1]+2)>>2))
- Variable ivRefPb refers to luma prediction block at (xRef, yRef) in the inter-view reference
picture indicated by ivRefPic.
- (xIvRefPb, yIvRefPb) refers to the left and upper position of the reference block indicated by
ivRefPb.
- Unless ivRefPb has been encoded in intra mode, the following is performed on X ranging
from 0 to 1.
- When X is 0 or current slice is slice B, the following is performed on Y ranging from X to
(1−X).
- refPixListLYIvRef, predFlagLYIvRef[x][y] mvLYIvRef[x][y], and refIdxLYIvRef[x][y],
respectively, are set to RefPicListLY, PredFlagLY[x][y], MvLY[x][y], and RefIdxLY[x][y] in
the picture indicated by ivRefPic.
- If predFlagLYIvRef[xIvRefPb][yIvRefPb] is 1, the following is performed on i ranging from
0 to num_ref_idx_1X_active_minus1 (the number of reference pictures in reference picture
list).
- If POC of refPicListLYIvRef[refIdxLYIvRef[xIvRefPb][yIvRefPb]] is the same as
RefPicListLX[i] and spPredFlagLX[xBlk][yBlk] is 0, the following applies.
    spMvLX[ xBlk ][ yBlk ] = mvLYIvRef[ xIvRefPb ][ yIvRefPb ]
    spRefIdxLX[ xBlk ][ yBlk ] = i
    spPredFlagLX[ xBlk ][ yBlk ] = 1
    curAvailableFlag = 1
- The following applies according to curAvailableFlag.
- If curAvailableFlag is 0, the following applies to X ranging from 0 to 1.
    spMvLX[ xBlk ][ yBlk ] = centerMvLX
    spRefIdxLX[ xBlk ][ yBlk ] = centerRefIdxLX
    spPredFlagLX[ xBlk ][ yBlk ] = centerPredFlagLX
- Variable curSubBlockIdx is set to curSubBlockIdx+1.
Otherwise, i.e., if centerAvailableFlag is 0, the process is terminated.

Embodiment 2 is described again based on Table 3.

The variables in Table 3 are the same as those in Table 2.

The inter prediction module 2100 performs initialization before deriving motion information on a current sub prediction unit using a sub prediction unit of a reference block. The initialization is the same as that described above in connection with Table 2.

The inter prediction module may specify the position of the center sub prediction unit of the reference block. The position of the referenced block may be determined based on the reference position, and reference position (xRef, yRef) is derived as in Equation 18.

$$xRef=Clip3(0,PicWidthInSampleL-1,xPb+(nPbW/nSbW/2)*nSbW+nSbW/2)$$

$$yRef=Clip3(0,PicHeightInSampleL-1,yPb+(nPbH/nSbH/2)*nSbH+nSbH/2) \quad \text{[Equation 18]}$$

ivRefPic is a picture having the same ViewIdx as refViewIdx in the current access unit, and ivRefPb is a prediction block or sub prediction unit covering (xRef, yRef) derived by Equation 19 in ivRefPic.

(xIvRefPb, yIvRefPb) specifies the left and upper position of ivRefPb.

In case ivRefPb has not been encoded/decoded in intra mode, and X is 0 or the current slice is slice B, the following process applies to Y ranging from X to (1−X).

As described above in connection with Table 2, refPicListLYIvRef is set to RefPicListLY, predFlagLYIvRef[x][y] to PredFlag[x][y], and refIdxLYIvRef[x][y] to RefIdxLY[x][y].

If predFlagLYIvRef[xIvRefPb][yIvRefPb] is 1, Equation 19 applies to i ranging from 0 to num_ref_idx_1X_active_minus1(the number of reference pictures in the reference picture list X in case POC (Picture Order Count) of refPicListLYIvRef[refIdxLYIvRef[xIvRefPb][yIvRefPb]] is RefPicListLX[i], and availableFlagLXInterView is 0.

$$centerAvailableFlag=1$$

$$centerMvLX=mvLYIvRef[xIvRefPb][yIvRefPb]$$

$$centerRefIdxLX=i$$

$$centerPredFlagLX=1 \quad \text{[Equation 19]}$$

In Equation, centerAvailableFlag denotes whether the center sub prediction unit of the reference block is available, and centerMvLX means the motion vector for the center sub prediction unit of the reference block. Further, centerRefIdxLX refers to the reference index for the center sub prediction unit of the reference block, and centerPredFlagLX refers to the reference picture list of the center sub prediction unit. Here, centerAvailableFlag, centerMvLX, centerRefIdxLX, and/or centerPredFlagLX mean motion information of the center sub prediction unit. In other words, the inter prediction module 2100 may store in the storage space the motion information on the center sub prediction unit of the reference block set in Equation 19.

After the variables have been set as described above, in case centerAvailableFlag is 1, the inter prediction module 2100 performs the following process on yBlk that ranges from 0 to (nPbH/nSbH−1) and xBlk that ranges from 0 to (nPbW/nSbW−1). Here, xBlk means the x coordinate of the block, and yBlk means the y coordinate of the block. In other words, if motion information available from the sub block at the center of the reference block is derived, the inter prediction module 2100 may derive motion information on the current block on a per-sub prediction unit basis.

First, the inter prediction module 2100 initializes the information for identifying whether to predict motion information from a sub prediction unit of the reference block, the sub prediction unit prediction flag, motion information on the sub prediction unit, and reference index of the sub prediction unit. The initialization is the same as that described above in connection with Table 2.

The position (xRef, yRef) of the reference block is reset as shown in Equation 20 on a per-sub prediction unit basis.

$x\text{Ref}=\text{Clip3}(0,\text{PicWidthInSamples}L-1,x$
  $\text{Pb}+x\text{Blk}*nSbW+nSbW/2+((\text{mvDisp}[0]+2)>>2)))$ $y\text{Ref}=\text{Clip3}(0,\text{PicHeightInSamples}L-1,y$
  $\text{Pb}+y\text{Blk}*nSbH+nSbH/2+((\text{mvDisp}[0]+2)>>2)))$   [Equation 20]

Here, xRef means the x coordinate of the position of the reference block, and yRef means the y coordinate of the position of the reference block. PicWidthInSamplesL means the width of the current picture, and PicHeightInSamplesL means the height of the current picture. Clip3( ) has been described above.

In case the inter-view reference block is encoded in intra mode, the inter prediction module 2100 performs the following process on X that ranges from 0 to 1.

When X is 0 or the current slice is slice B, each variable is reset for Y (Y ranges from X to (1−X)) as follows. The initialization is the same as that described above in connection with Table 2.

In case predFlagLYIvRef[xIvRefPb][yIvRefPb] is 1, the following Equation 21 may apply to i ranging from 0 to num_ref_idx_lX_active_minus1(the number of reference pictures in the reference picture list) if POC of refPicListLYIvRef[refIdxLYIvRef[xIvRefPb][yIvRefPb]] is RefPicListLX[i] and spPredFlagLX[xBlk][yBlk] is 0.

$sp\text{Mv}LX[x\text{Blk}][y\text{Blk}]=\text{mv}LY\text{IvRef}[x\text{IvRefPb}]$
  $[y\text{IvRefPb}]$ $sp\text{RefIdx}LX[x\text{Blk}][y\text{Blk}]=i$ $sp\text{PredFlag}LX[x\text{Blk}][y\text{Blk}]=1$ curAvailableFlag=1  [Equation 21]

Even after the above-described process has been performed, if curAvailableFlag as set is 0 (i.e., unless spRefIdxLX=i (e.g., spRefIdxLx=−1), and spPredFlagLX=1 (e.g., spPredFlagLX=−1)), it may be said that no motion information may be derived on a per-sub prediction unit basis. Accordingly, the inter prediction module 2100 may apply Equation 22 to X ranging from 0 to 1.

In other words, in case motion information cannot be derived from the sub prediction unit of the reference block, the inter prediction module 2100 may derive motion information on the sub prediction unit of the current block from the motion information on the center sub unit.

$sp\text{Mv}LX[x\text{Blk}][y\text{Blk}]=\text{centerMv}LX$ $sp\text{RefIdx}LX[x\text{Blk}][y\text{Blk}]=\text{centerRefIdx}LX$ $sp\text{PredFlag}LX[x\text{Blk}][y\text{Blk}]=\text{centerPredFlag}LX$   [Equation 22]

Finally, after all of the above-described processes have been done, variable, curSubBlockIdx. is set to curSubBlockIdx+1, and if availableFlagL0InterView and availableRagL1Interview are 0, die process of deriving motion information according to embodiment 2 is ended.

Figure 24:
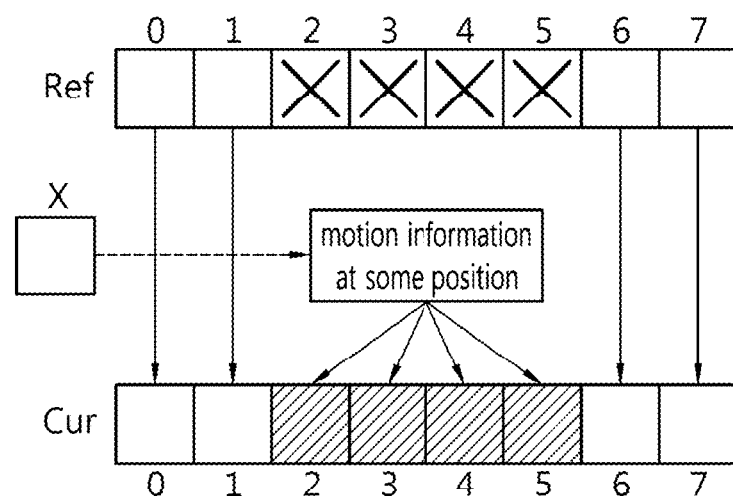
FIG. 24 is a view illustrating an exemplary process of deriving motion information on a sub prediction unit of a current block using motion information at a position.

FIG. 24 is a view illustrating an exemplary process of deriving motion information on a sub prediction unit of a current block using motion information at a position.

Referring to FIG. 24, the blocks positioned at the upper end of FIG. 24 mean sub prediction units of the reference block, and the blocks positioned at the lower end of FIG. 24 mean sub prediction units of the current block. X denotes a position, and motion information at X is stored in a storage space. Here, the motion information at the position of FIG. 24 may mean motion information at the center position of the reference block as in embodiment 1, and the motion information at the position of FIG. 24 may mean the motion information on the center sub prediction unit of the reference block as in embodiment 2.

Upon deriving the motion information on the sub prediction unit of the current block using the motion information at the position, each sub prediction unit in the reference block may utilize the motion information at the position. In other words, motion information on the plurality of sub prediction units of the current block may be simultaneously derived using the motion information at the position, and deriving motion information using the motion information at the position may address the issue of data dependency. Accordingly, upon use of motion information at the position, the inter prediction module 2100 may derive motion information in parallel.

As described above, embodiments 1 and 2 derive motion information using motion information present at any position. Accordingly, the motion information deriving methods according to embodiments 1 and 2 enable independent derivation of motion information on each sub prediction unit in the reference block. In other words, embodiments 1 and 2 do not require sequential discovery of sub prediction units from which motion information may be derived in order to find sub prediction units from which motion information may be derived, and in case the first sub prediction unit of the reference block is impossible to use for deriving motion information, embodiments 1 and 2 derive motion information on the sub prediction unit of the current block using predetermined motion information. As such, the motion information derivation according to embodiments 1 and 2 remove data dependency, enabling parallelized derivation of motion information on each sub prediction unit. Further, the motion information derivation according to embodiments 1 and 2 prevent additional memory access in contrast to existing motion information deriving methods, thus reducing the number of times of accessing the memory.

Embodiment 3

Figure 25:
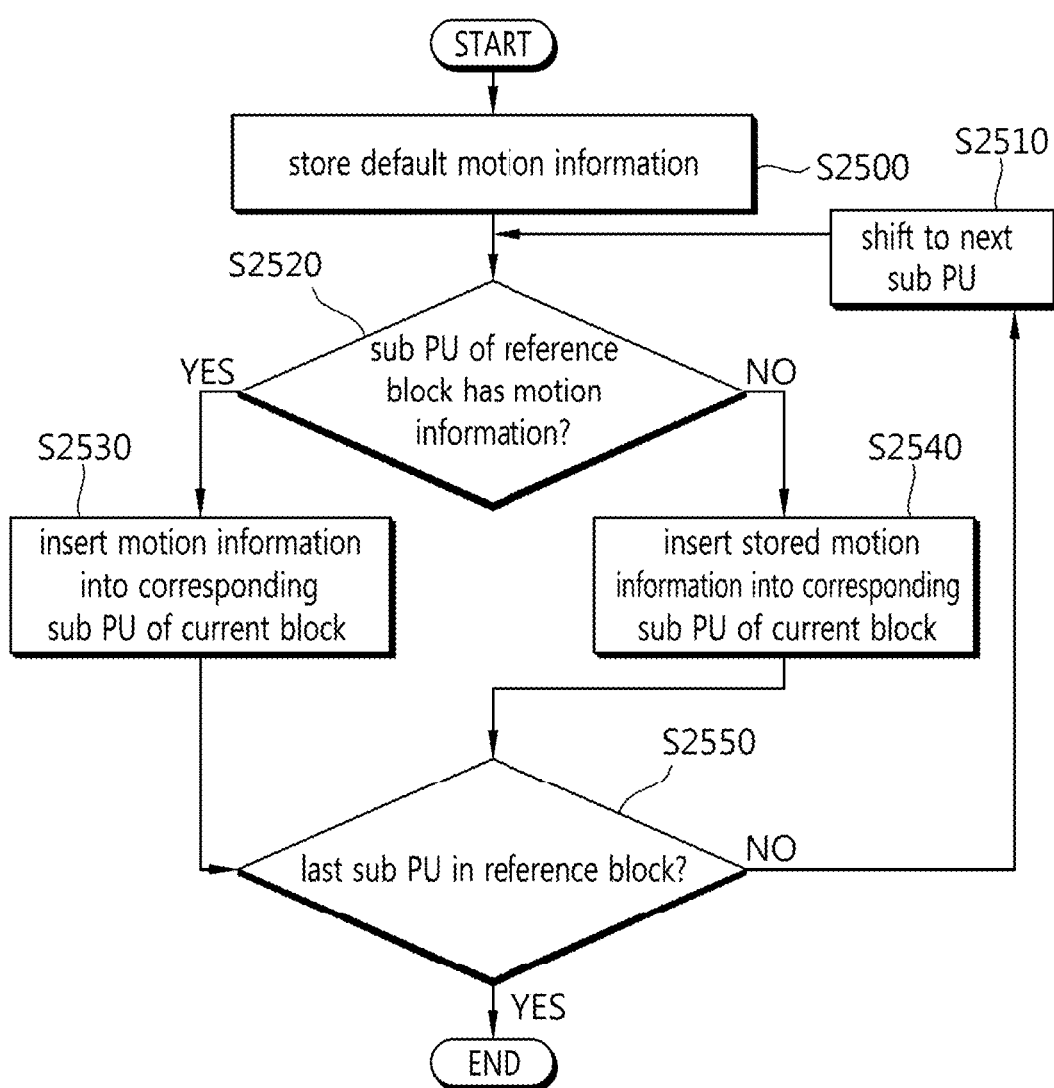
FIG. 25 is a flowchart illustrating a method of deriving motion information on a sub prediction unit of a current block using a motion information value according to another embodiment of the present invention.

FIG. 25 is a flowchart illustrating a method of deriving motion information on a sub prediction unit of a current block using a motion information value according to another embodiment of the present invention.

Referring to FIG. 25, embodiment 4 provides a method of setting default motion information and deriving motion information on a current sub prediction unit from the default motion information in case motion information is impossible to derive from a sub prediction unit of a reference block. Here, the default motion information may mean a zero vector. A specific method of deriving motion information according to embodiment 3 is described below.

The inter prediction module 2100 may store the default motion information in a storage space (S2500). A specific process of storing motion information by the inter prediction module 2100 has been described above.

Subsequently, the inter prediction module 2100 may derive motion information on the current sub prediction unit. The inter prediction module 2100 may determine whether the sub prediction unit of the reference block corresponding to the current sub prediction unit has motion information (S2520).

In case the sub prediction unit of the reference block has motion information, the inter prediction module 2100 may insert into the current sub prediction unit the motion information on the sub prediction unit of the reference block (S2530). Unless the sub prediction unit of the reference block has motion information, the inter prediction module 2100 may insert the motion information stored in the storage space into the current sub prediction unit (S2540).

The inter prediction module 2100 may determine whether the sub prediction unit of the reference block which is targeted for deriving motion information is the last sub prediction unit (S2550). In case the sub prediction unit of the reference block is the last sub prediction unit, the inter prediction module 2100 may terminate the process of deriving motion information. Unless the sub prediction unit of the reference block is the last sub prediction unit, the inter prediction module 2100 may discover motion information on a next sub prediction unit of the reference block in order to continue to derive motion information (S2510).

The above-described motion information deriving process according to embodiment 3 may apply to 3D-HEVC Draft Text 2 as in Table 4.

TABLE 4

This process has the following inputs.
- Position (xPb, yPb) of left and upper end of current prediction unit
- Width (nPbW) and height of current prediction unit
- Reference view index refViewIdx
- Disparity vector mvDisp
This process has the following outputs.
- Flag availableFlagLXinterView for determining whether temporal inter-view motion candidate is available, where LX may be reference picture list L0 and L1.
- Temporal inter-view motion vector candidate mvLXInterView, where LX may be reference picture lists L0 and L1.
- Reference index refIdxLXInterView designating a reference picture present in reference picture list RefPicListLX, where LX may be reference picture lists L0 and L1.
LX may be reference picture lists L0 and L1. The following applies to LX.
- Flag availableFlagLXInterView is initialized as 0.
- Motion vector mvLXInterView is initialized as (0,0).
- Reference index refIdxLXInterView is initialized as −1.
Variables nSbW and nSbH are initialized as follows.
- nSbW=Min(nPbW, SubPbSize)
- nSbH=Min(nPbH, SubPbSize)
where, SubPbSize is the size including height and width of the sub prediction unit designated by VPS.
Variable ivRefPic is initialized as a picture having the same ViewIdx as refViewIdx in the current access unit.
Variable curSubBlockIdx is initialized as 0.
Variables availableFlagL0InterView and availableFlagL1Interview are initialized as follows.
   availableFlagL0Zero= 1
   mvL0Zero = (0, 0)
   refIdxL0Zero = 0
If current slice is slice B,
   availableFlagL1Zero = 1
   mvL1Zero = (0, 0)
   refIdxL1Zero = 0
The following applies to yBlk ranging from 0 to (nPbH/nSbH−1) and xBlk ranging from 0 to (nPbW/nSbW−1).
- Variable curAvailabeFlag is initialized as 0.
- The following applies to X ranging from 0 to 1.
- Flag spPredFlagL1[xBlk][yBlk] is initialized as 0.
- Motion vector spMvLX is initialized as (0, 0).
- Reference index spRefIdxLX[xBlk][yBlk] is initialized as −1.
- Reference block position (xRef, yRef) is derived as follows.
   xRef = Clip3( 0, PicWidthInSamplesL − 1.
   xPb + xBlk * nSbW + nSbW / 2 + ( ( mvDisp[ 0 ] + 2 ) >> 2 ) )
   yRef = Clip3( 0, PicHeightInSamplesL − 1.
   yPb + yBlk * nSbH + nSbH / 2 + ( ( mvDisp[ 1 ] + 2 ) >> 2 ) )
- Variable ivRefPb refers to the luma prediction block at (xRef, yRef) in the inter-view reference picture indicated by ivRefPic.
- (xIvRefPb, yIvRefPb) refers to the left and upper position of the reference block indicated by ivRefPb.
- Unless ivRefPb has been encoded in intra mode, the following may apply to X ranging TABLE 4-continued from 0 to 1
- When X is 0 or current slice is slice B, the following applies to Y ranging from X to (1−X).
- refPixListLYIvRef, predFlagLYIvRef[x][y], mvLYIvRef[x][y], and refIdxLYIvRef[x][y], respectively, are set to their respective corresponding variables, i.e., RefPicListLY, PredFlagLY[x][y], MvLY[x][y], and RefIdxLY[x][y] in the inter-view reference picture ivRefPic.
- If predFlagLYIvRef[xIvRefPb][yIvRefPb] is 1, the following may apply to i ranging from 0 to num_ref_idx_1X_active_minus1 (the number of reference pictures in reference picture list).
- If POC (Picture Order Count) of refPicListLYIvRef[refIdxLYIvRef[xIvRefPb][yIvRefPb]] is the same as RefPicListLX[i] and centerPredFlag is 0, the following applies.
   spMvLX[ xBlk ][ yBlk ] = mvLYIvRef[ xIvRefPb ][ yIvRefPb ]
   spRefIdLX[ xBlk ][ yBlk ] = i
   spPredFlagLX[ xBlk ][ yBlk ] = 1
   curAvailableFlag = 1
- The following applies according to curAvailableFlag.
- If curAvailableFlag is 0, the following applies to X ranging from 0 to 1.
   spMvLX[ xBlk ][ yBlk ] = mvLXZero
   spRefIdxLX[ xBLk ][ yBlk ] = refIdxLXZero
   spPredFlagLX[ xBlk ][ yBlk ] = availableFlagLXZero
- Variable curSubBlockIdx is set to curSubBlockIdx+1.

Embodiment 3 is described again based on Table 4. The variables in Table 3 are the same as those in Table 2.

The inter prediction module 2100 performs initialization before deriving motion information on a current sub prediction unit using a sub prediction unit of a reference block. The initialization is the same as that described above in connection with Table 2.

Further, the variables, availableFlagLXZero, mvLXZero, and refIdxLXZero, are set as in Equations 23 and 24. Here, X is 0 or 1.

$$availableFlagL0Zero=1$$

$$mvL0Zero=(0,0)$$

$$refIdxL0Zero=0 \quad \text{[Equation 23]}$$

$$availavleFagL1Zero=1$$

$$mvL1Zero=(0,0)$$

$$refIdxL1Zero=0 \quad \text{[Equation 24]}$$

Here, availableFlagLXZero means an identifier regarding whether the default motion information is available, mvLXZero the default motion information, and refIdxLXZero the reference index of the default motion information.

After setting the variables as above, the inter prediction module 2100 performs the following process on yBlk that ranges from 0 to (nPbH/nSbH−1) and xBlk that ranges from 0 to (nPbW/nSbW−1). Here. xBlk means the x coordinate of the block, and yBlk means the y coordinate of the block.

First, the inter prediction module 2100 initializes the information for identifying whether to predict motion information front a sub prediction unit of the reference block, the sub prediction unit prediction Hag. motion information on the sub prediction unit, and reference index of the sub prediction unit. The initialization is the same as that described above in connection with Table 2.

The position (xRef. yRef) of the reference block is reset as shown in Equation 25 on a per-sub prediction unit basis.

$$xRef=Clip3(0,PicWidthInSamplesL-1,x\\Pb+xBlk*nSbW+nSbW/2+((mvDisp[0]+2)\gg2)))$$

$$yRef=Clip3(0,PicHeightInSamplesL-1,y\\Pb+yBlk*nSbH+nSbH/2+((mvDisp[0]+2)\gg2))) \quad \text{[Equation 25]}$$

In case the inter-view reference block is encoded in intra mode, the inter prediction module 2100 may perform the following process on X that ranges from 0 to 1.

When X is 0 or the current slice is slice B, each variable is reset for Y (Y ranges from X to (1−X)) as described above in connection with Table 2.

In this case, if predFlagLYIvRef[xIvRefPb][yIvRefPb] is 1, the following Equation 26 may apply to i ranging from 0 to num_ref_idx_1X_active_minus1(the number of reference pictures in the reference picture list).

$$spMvLX[xBlk][yBlk]=mvLYIvRef[xIvRefPb][yIvRefPb]$$

$$spRefIdxLX[xBlk][yBlk]=i$$

$$spPredFlagLX[xBlk][yBlk]=1$$

$$curAvailableFlag=1 \quad \text{[Equation 26]}$$

After performing the above-described process, in case curAvailableFlag is 0, the inter prediction module 2100 may apply Equation 27 to X ranging from 0 to 1.

In other words, in case motion information cannot be derived from the sub prediction unit of the reference block, the inter prediction module 2100 may derive motion information on the sub prediction unit of the current block from the arbitrarily set default motion information.

$$spMvLX[xBlk][yBlk]=mvLXZero$$

$$spRefIdxLX[xBlk][yBlk]=refIdxLXZero$$

$$spPredFlagLx[xBlk][yBlk]=availableFlagLXZero \quad \text{[Equation 27]}$$

Finally, after all of the above-described processes have been done, variable. curSubBlockIdx, is set to curSubBlockIdx+1, and if availableFlagL0InterView and availableFlagL1Interview are 0. the process of deriving motion information according to embodiment 3 is ended.

Figure 26:
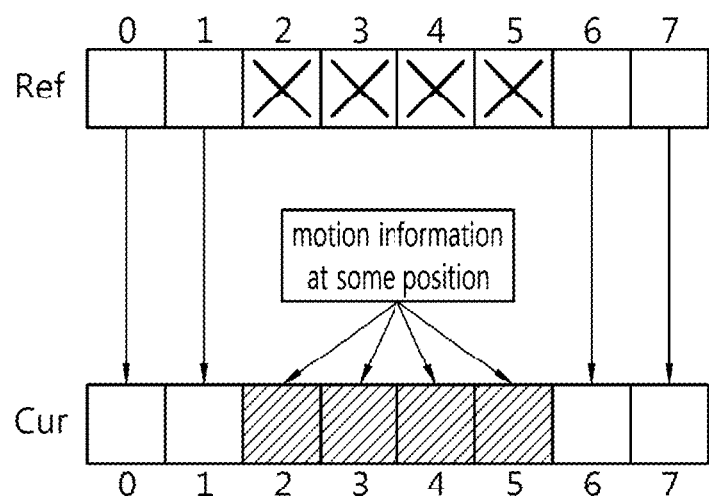
FIG. 26 is a view illustrating an exemplary process of deriving motion information on a sub prediction unit of a current block using some motion information.

FIG. 26 is a view illustrating an exemplary process of deriving motion information on a sub prediction unit of a current block using some motion information.

Referring to FIG. 26, the blocks positioned at the upper end of FIG. 26 mean sub prediction units of the reference block, and the blocks positioned at the lower end of FIG. 26 mean sub prediction units of the current block. Further, default motion information is stored in a storage space. Here, the default motion information shown in FIG. 26 may mean default motion information arbitrarily set according to embodiment 3.

Upon deriving the motion information on the sub prediction unit of the current block using the default motion information, each sub prediction unit in the reference block may utilize the default motion information that is arbitrarily set. In other words, motion information on the plurality of sub prediction units of the current block may be simultaneously derived using the default motion information, and the plurality of sub prediction units of the current block may address the issue of data dependency. Accordingly, upon use of default motion information with some value, the inter prediction module 2100 may derive motion information in parallel.

As described above, according to embodiment 3, the inter prediction module 2100 derives motion information using the default motion information with a value. Accordingly, the motion information deriving method according to embodiment 3 enables independent derivation of motion information on each sub prediction unit in the reference block. In other words, embodiment 3 does not require sequential discovery of sub prediction units from which motion information may be derived in order to find sub prediction units from which motion information may be derived, and in case the first sub prediction unit of the reference block is impossible to use for deriving motion information, embodiment 3 derives motion information on the sub prediction unit of the current block using predetermined motion information. As such, the motion information derivation according to embodiment 3 removes data dependency, enabling parallelized derivation of motion information on each sub prediction unit. Further, the motion information derivation according to embodiment 3 prevents additional memory access in contrast to existing motion information deriving methods, thus reducing the number of times of accessing the memory.

Figure 27:
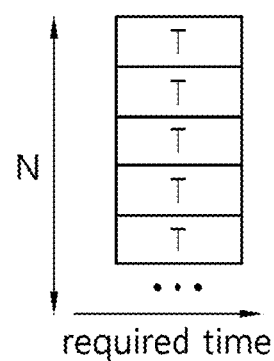
FIG. 27 is a view schematically illustrating times required to derive motion information according to the present invention.

FIG. 27 is a view schematically illustrating times required to derive motion information according to the present invention.

Referring to FIG. 20, when the time taken to derive motion information from one sub prediction unit is T, and the number of sub prediction units in a reference block is N, the time taken to derive all the motion information from the reference block is N×T. However, upon deriving motion information according to an embodiment of the present invention, the motion information derivation may be parallelized, and thus, the time of deriving motion information corresponds to T and a 3D image encoding/decoding delay is reduced.

The above-described embodiments may have different applicable ranges depending on block sizes, coding unit (CU) depths, or transform unit (TU) depths. As the variable for determining an applicable range, a value predetermined in the encoder/decoder or a value determined according to a profile or level may be used, or if the encoder specifies a variable value in the bitstream, the decoder may obtain the variable value from the bitstream.

For example, in case different applicable ranges apply depending on CU depths, there may be a scheme (method A) in which it applies only to a given depth or more, a scheme (method B) in which it applies only to the given depth or less, or a scheme (method C) in which it applies to the given depth only. In case the methods according to the present invention apply to none of the depths, an indicator (flag) may be used to indicate the same, or it may be indicated with a CU depth that the methods according to the present invention do not apply, where the CU depth may be set to be larger than the maximum depth that the CU may have.

TABLE 5

| Depth of CU (or PU or TU) representing applicable range | Method A | Method B | Method C |
| --- | --- | --- | --- |
| 0 | X | 0 | 0 |
| 1 | X | 0 | 0 |
| 2 | 0 | 0 | 0 |
| 3 | 0 | X | X |
| 4 or more | 0 | X | X |

In the above-described embodiments, the methods are described based on the flowcharts with a series of steps or units, but the present invention is not limited to the order of the steps, and rather, some steps may be performed simultaneously or in different order with other steps. It should be appreciated by one of ordinary skill in the art that the steps in the flowcharts do not exclude each other and that other steps may be added to the flowcharts or some of the steps may be deleted from the flowcharts without influencing the scope of the present invention.

Further, the above-described embodiments include various aspects of examples. Although all possible combinations to represent various aspects cannot be described, it may be appreciated by those skilled in the art that any other combination may be possible. Accordingly, the present invention includes all other changes, modifications, and variations belonging to the following claims.

The above-described methods according to the present invention may be prepared in a computer executable program that may be stored in a computer readable recording medium, examples of which include a ROM, a RAM, a CD-ROM, a magnetic tape, a floppy disc, or an optical data storage device, or may be implemented in the form of a carrier wave (for example, transmission through the Internet).

The computer readable recording medium may be distributed in computer systems connected over a network, and computer readable codes may be stored and executed in a distributive way. The functional programs, codes, or code segments for implementing the above-described methods may be easily inferred by programmers in the art to which the present invention pertains.

Although the present invention has been shown and described in connection with preferred embodiments thereof, the present invention is not limited thereto, and various changes may be made thereto without departing from the scope of the present invention defined in the following claims, and such changes should not be individually construed from the technical spirit or scope of the present invention.

The invention claimed is:

1. A method of decoding an image, the method comprising:
   deriving motion information of a current block; and
   deriving a prediction sample for the current block based on the motion information of the current block,
   wherein the deriving motion information of the current block comprises:
   determining whether a center sub block within a reference block has motion information;

when the center sub block within the reference block has motion information, deriving motion information of sub blocks within the current block from sub blocks within the reference block; and when the center sub block within the reference block does not have motion information, terminating the deriving motion information of sub blocks within the current block from sub blocks within the reference block, wherein the center sub block corresponds to a center position of the current block, and wherein the motion information includes at least a motion vector.

2. The method of claim 1, wherein the deriving motion information of sub blocks within the current block comprises:

determining whether a sub block within the reference block has motion information, the sub block within the reference block corresponding to a current sub block within the current block;

when the sub block within the reference block has motion information, deriving motion information of the current sub block within the current block from the sub block within the reference block; and when the sub block within the reference block does not have motion information, deriving motion information of the current sub block within the current block from the center sub block within the reference block.

3. A method of encoding an image, the method comprising:

determining motion information of a current block; and encoding the motion information of the current block, wherein the deriving motion information of the current block comprises:

determining whether a center sub block within a reference block has motion information;

when the center sub block within the reference block has motion information, deriving motion information of sub blocks within the current block from sub blocks within the reference block; and when the center sub block within the reference block does not have motion information, terminating the deriving motion information of sub blocks within the current block from sub blocks within the reference block, wherein the center sub block corresponds to a center position of the current block, and wherein the motion information includes a motion vector.

4. The method of claim 3, wherein the deriving motion information of sub prediction blocks within the current block comprises:

determining whether the sub block within the reference block has motion information, the sub block within the reference block corresponding to a current sub block within the current block;

when the sub block within the reference block has motion information, deriving motion information of the current sub block within the current block from the sub block within the reference block; and when the sub block within the reference block does not have motion information, deriving motion information of the current sub block within the current block from the center sub block within the reference block.

5. A non-transitory computer readable recording medium storing a bitstream formed by a method of encoding an image, the method comprising:

deriving motion information of a current block; and deriving a prediction sample for the current block based on the motion information of the current block, wherein the deriving motion information of the current block comprises:

determining whether a center sub block within a reference block has motion information;

when the center sub block within the reference block has motion information, deriving motion information of sub blocks within the current block from sub blocks within the reference block; and when the center sub block within the reference block does not have motion information, terminating the deriving motion information of sub blocks within the current block from sub blocks within the reference block, wherein the center sub block corresponds to a center position of the current block, and wherein the motion information includes a motion vector.

* * * * *